United States Patent
Yang

(10) Patent No.: US 9,911,963 B2
(45) Date of Patent: *Mar. 6, 2018

(54) ELECTRICITY STORING/DISCHARGING DEVICE WITH MULTIPLE-LAYER PACKAGE STRUCTURE HAVING ELECTRODE PLATE PAIR WITH MULTIPLE-SIDED ELECTRIC CONDUCTIVE TERMINALS CONVERTED INTO SINGLE INPUT/OUTPUT ELECTRIC CONDUCTIVE INTERFACE

(71) Applicant: Tai-Her Yang, Dzan-Hwa (TW)

(72) Inventor: Tai-Her Yang, Dzan-Hwa (TW)

( * ) Notice: Subject to any disclaimer, the term of this patent is extended or adjusted under 35 U.S.C. 154(b) by 453 days.

This patent is subject to a terminal disclaimer.

(21) Appl. No.: 14/310,517

(22) Filed: Jun. 20, 2014

(65) Prior Publication Data

US 2015/0372282 A1  Dec. 24, 2015

(51) Int. Cl.
| | |
|---|---|
| *H01M 2/08* | (2006.01) |
| *H01M 2/30* | (2006.01) |
| *H01M 2/02* | (2006.01) |
| *H01G 11/04* | (2013.01) |
| *H01G 11/26* | (2013.01) |
| *H01M 2/26* | (2006.01) |
| *H01M 2/16* | (2006.01) |
| *H01M 8/0247* | (2016.01) |
| *H01M 2/10* | (2006.01) |

(Continued)

(52) U.S. Cl.
CPC .............. *H01M 2/30* (2013.01); *H01G 11/04* (2013.01); *H01G 11/26* (2013.01); *H01M 2/021* (2013.01); *H01M 2/0212* (2013.01); *H01M 2/0257* (2013.01); *H01M 2/0277* (2013.01); *H01M 2/0285* (2013.01); *H01M 2/0287* (2013.01); *H01M 2/0292* (2013.01); *H01M 2/26* (2013.01); *H01M 2/1061* (2013.01); *H01M 2/1653* (2013.01); *H01M 4/70* (2013.01); *H01M 8/0247* (2013.01); *H01M 10/0431* (2013.01)

(58) Field of Classification Search
CPC ........ H01M 2/06; H01M 2/1077; H01M 2/30; H01M 2/021; H01M 2/0212; H01M 2/0257; H01M 2/0277; H01M 2/0285; H01M 2/0287; H01M 2/0292; H01M 2/26; H01M 2/1061; H01M 2/1653; H01M 4/70; H01M 10/0431; H01M 8/0247

See application file for complete search history.

(56) References Cited

U.S. PATENT DOCUMENTS

| | | | |
|---|---|---|---|
| 2004/0002001 A1* | 1/2004 | Watanabe | ........... H01M 2/0262 429/181 |
| 2011/0129721 A1* | 6/2011 | Yang | ....................... H01M 4/70 429/161 |

* cited by examiner

*Primary Examiner* — Jimmy K Vo
(74) *Attorney, Agent, or Firm* — Bacon & Thomas, PLLC

(57) ABSTRACT

The present invention discloses an electricity storing/discharging device with multiple-layer package structure having electrode plate pair with multiple-sided electric conductive terminals converted into single input/output electric conductive interface, which is applied in a multiple-layer package structure with specific single-sided input/output and having electrode plate pair with multiple-sided input/output terminals, thereby allowing the electrode plate pair with multiple-sided electric conductive terminals to be structured as an input/output electric conductive interface through single-sided input/output electric conductive terminals having positive and negative polarities for the purpose of transferring electric energy to the exterior.

20 Claims, 13 Drawing Sheets

(51) Int. Cl.
*H01M 4/70* (2006.01)
*H01M 10/04* (2006.01)

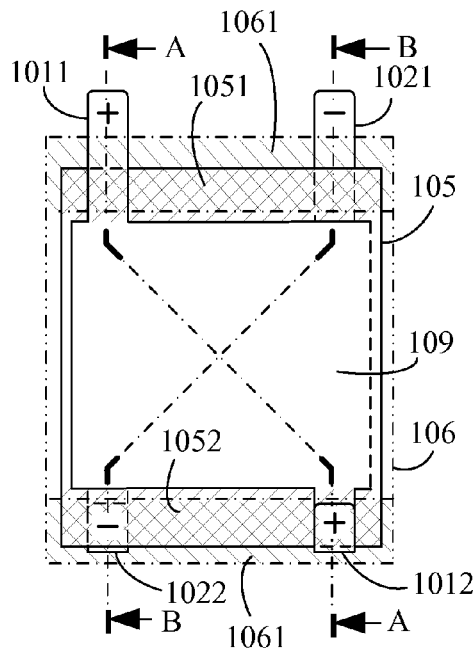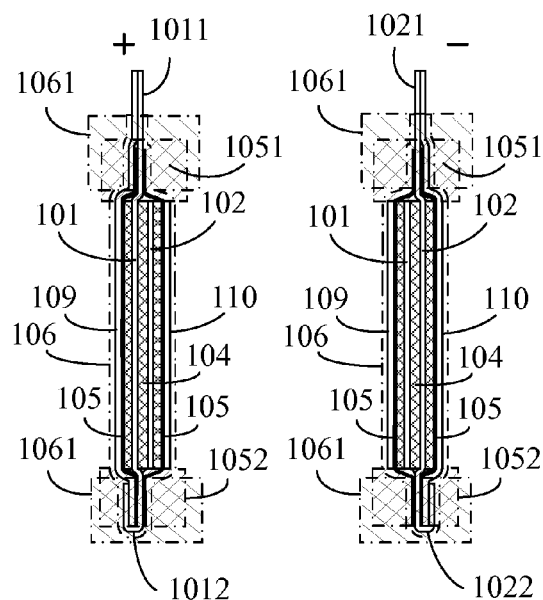
Fig. 9　　　　Fig. 10　　　　Fig. 11
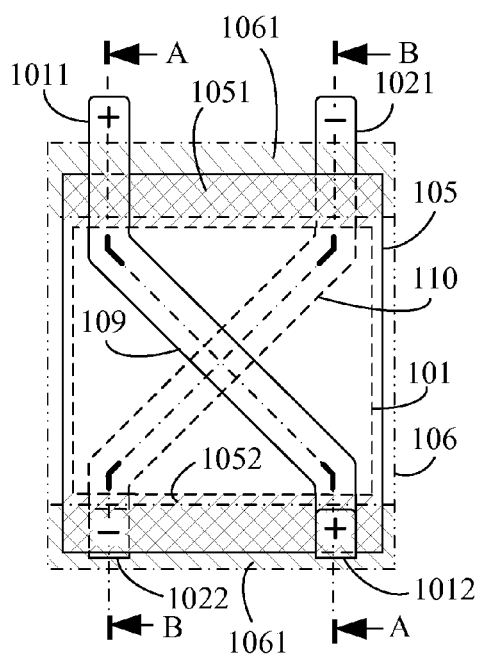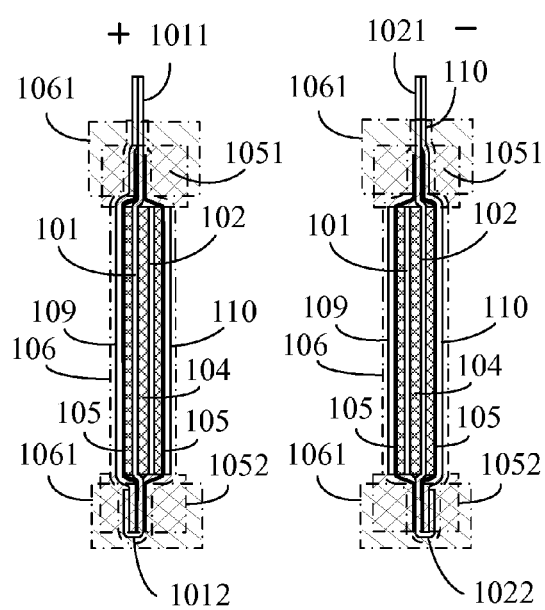
Fig. 12　　　　Fig. 13　　　　Fig. 14

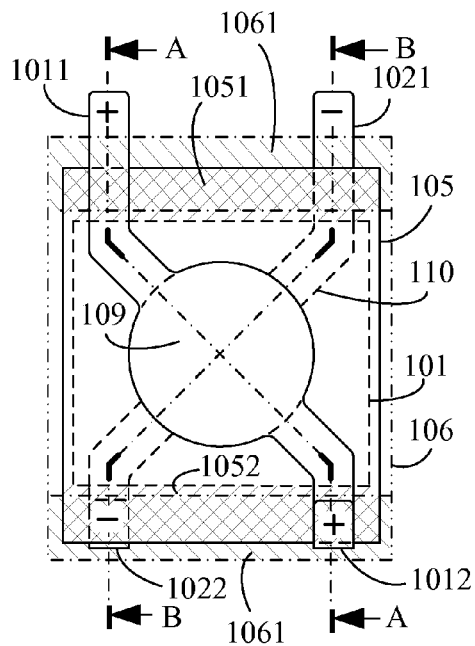
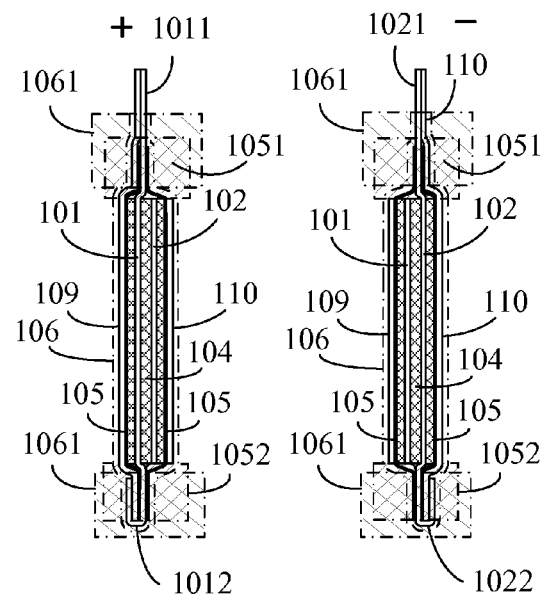
Fig. 15    Fig. 16    Fig. 17
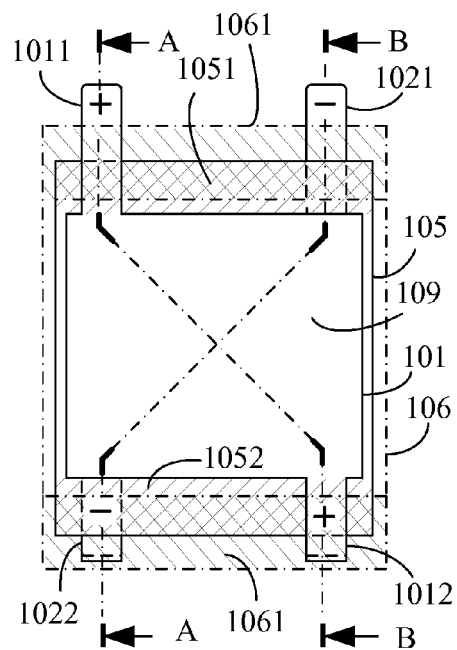
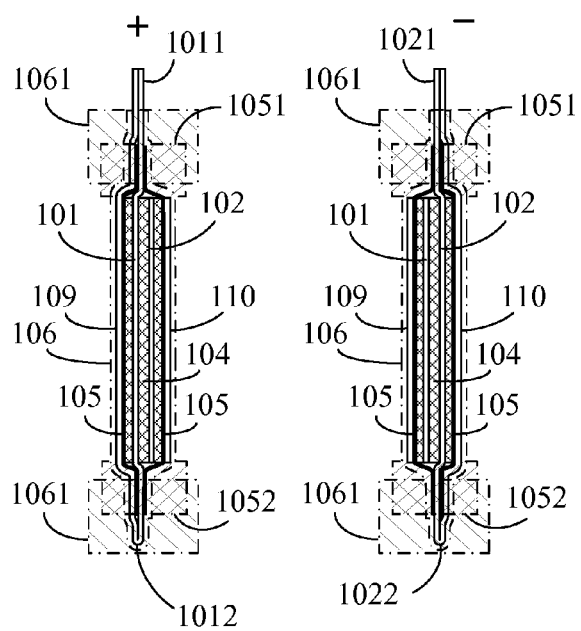
Fig. 18    Fig. 19    Fig. 20

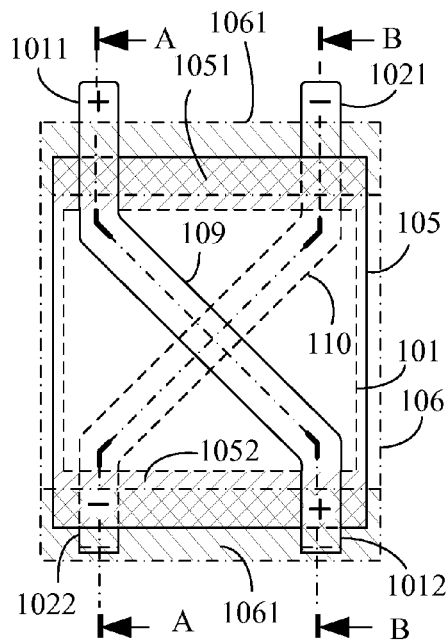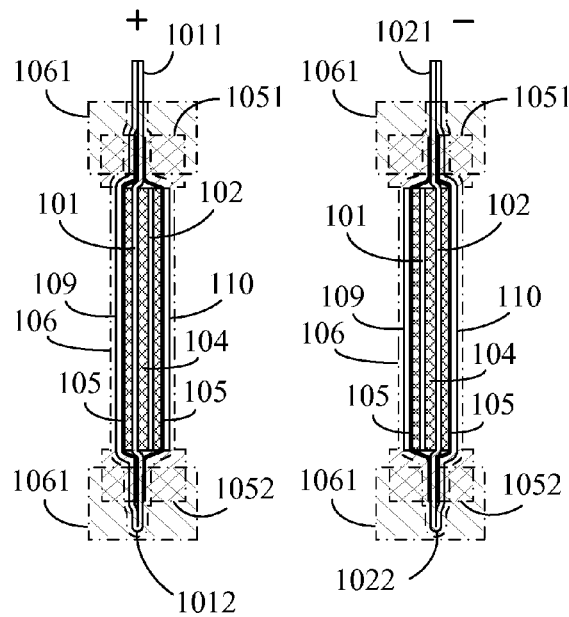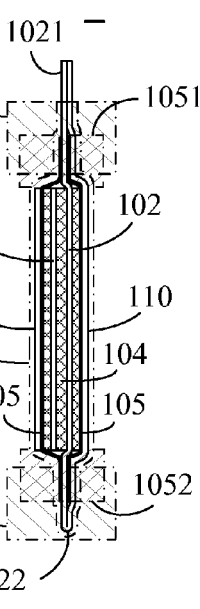
Fig. 21  Fig. 22  Fig. 23
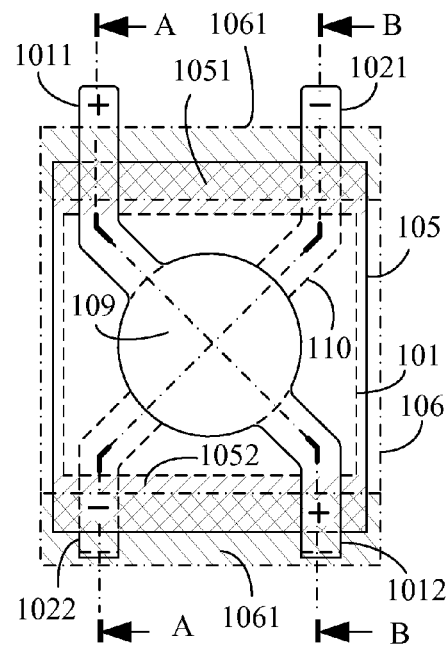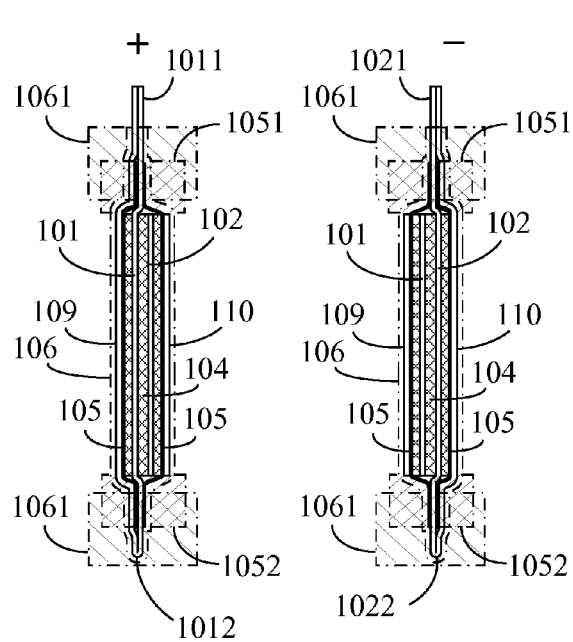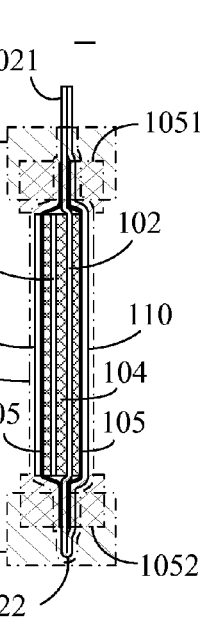
Fig. 24  Fig. 25  Fig. 26

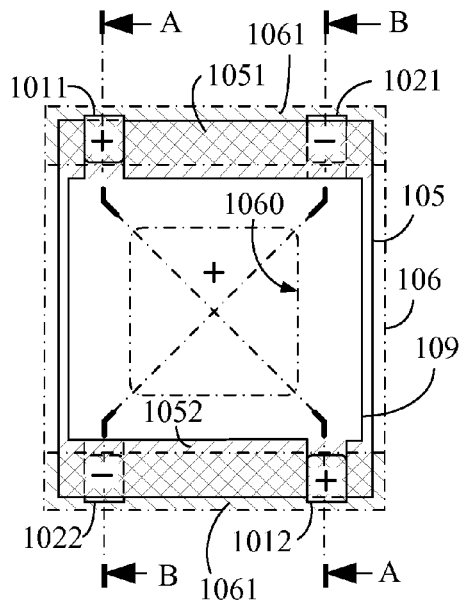
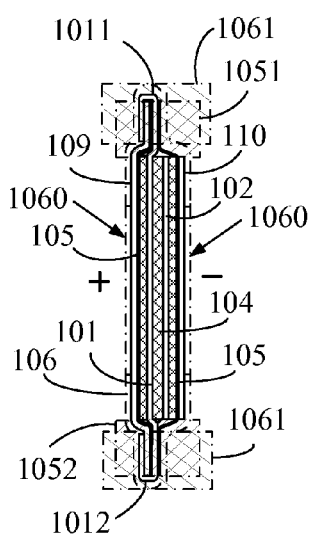
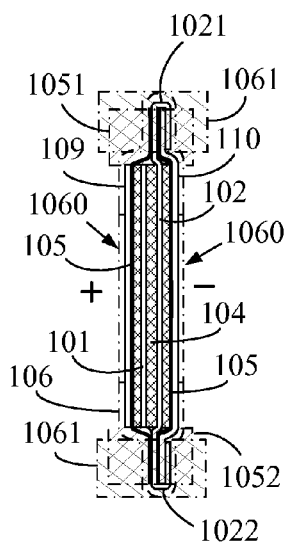
Fig. 27  Fig. 28  Fig. 29
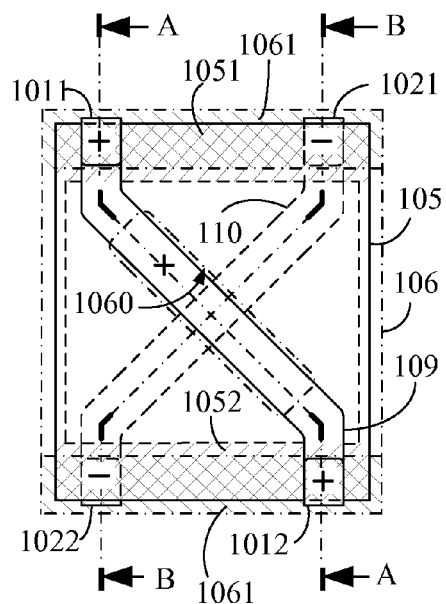
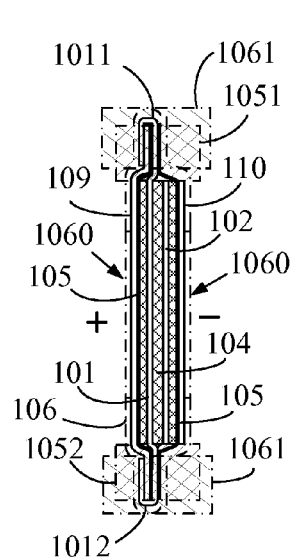
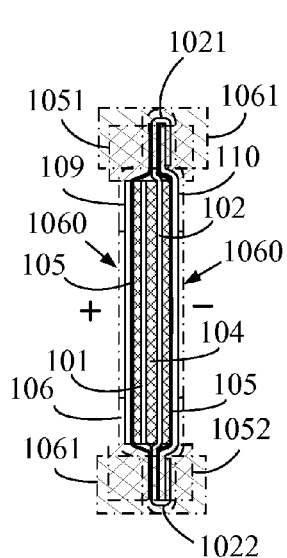
Fig. 30  Fig. 31  Fig. 32

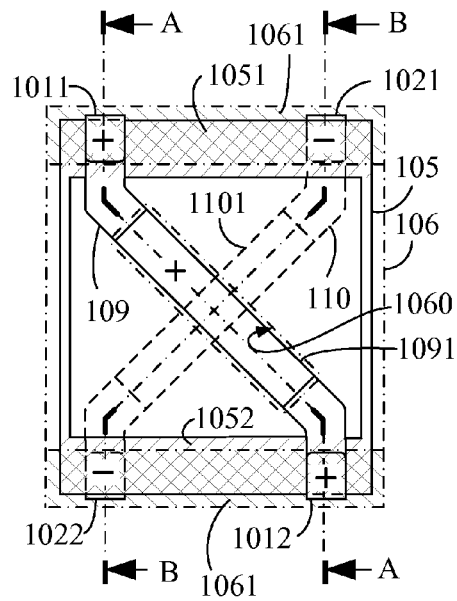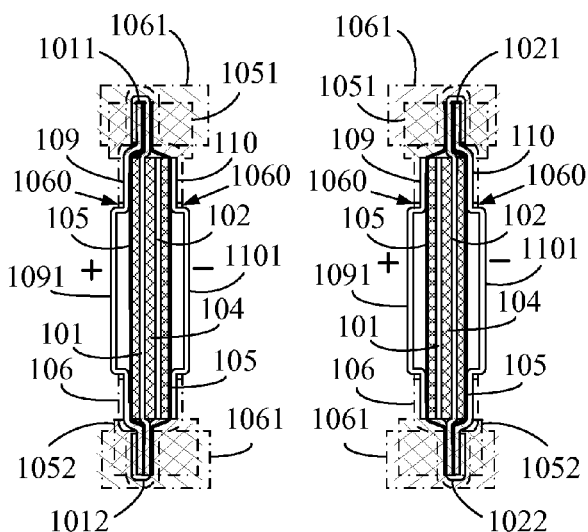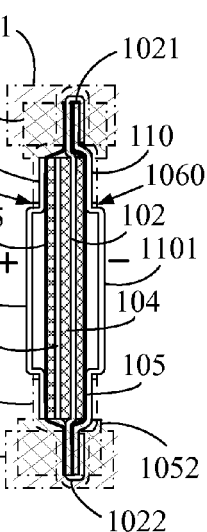
Fig. 39　　　　　Fig. 40　　　　　Fig. 41
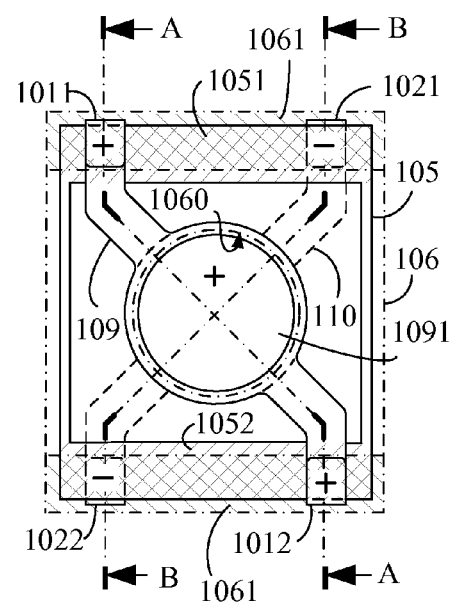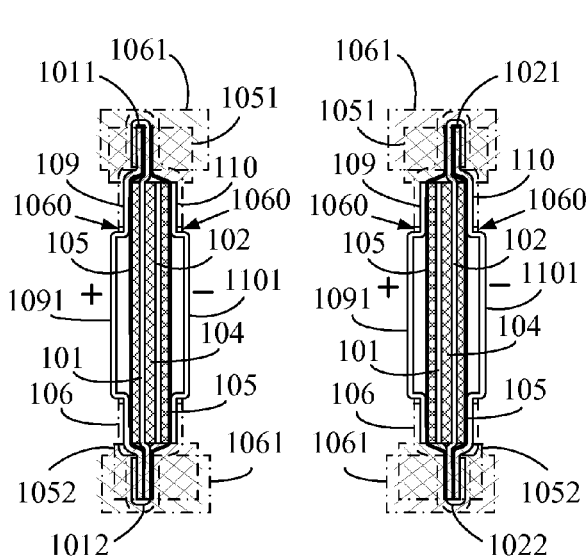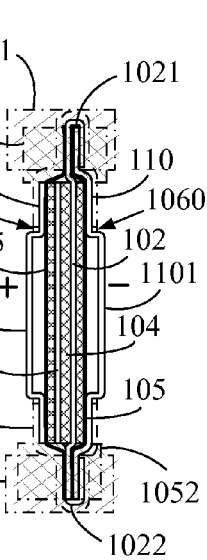
Fig. 42　　　　　Fig. 43　　　　　Fig. 44

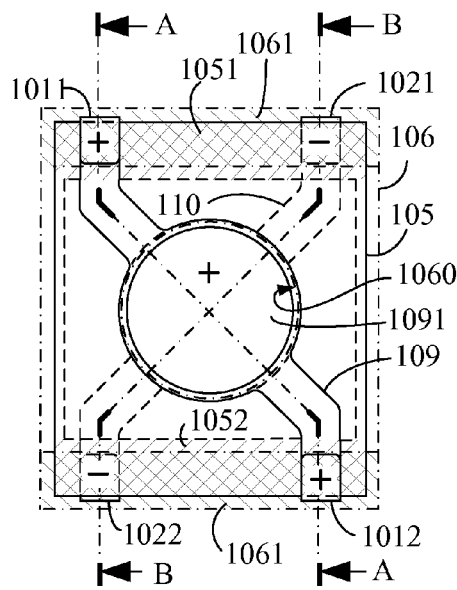
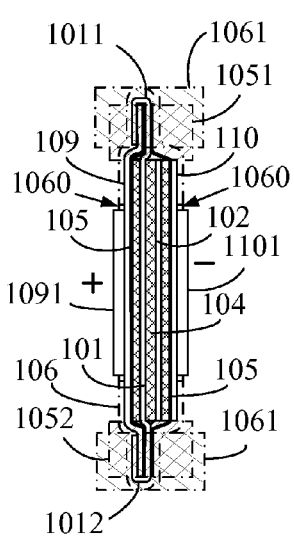
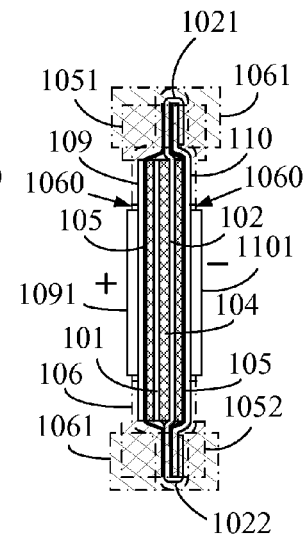
Fig. 51  Fig. 52  Fig. 53
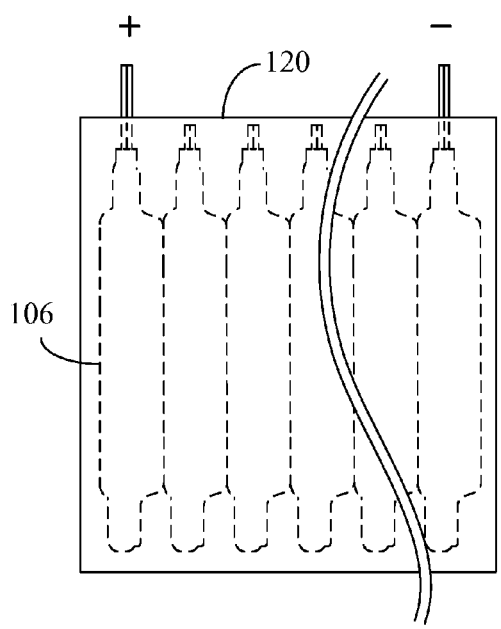
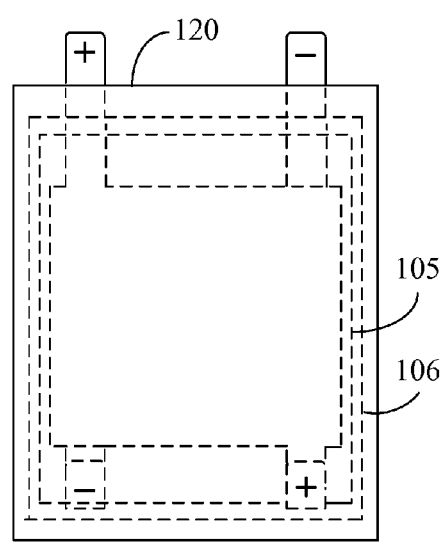
Fig. 54  Fig. 55

ELECTRICITY STORING/DISCHARGING DEVICE WITH MULTIPLE-LAYER PACKAGE STRUCTURE HAVING ELECTRODE PLATE PAIR WITH MULTIPLE-SIDED ELECTRIC CONDUCTIVE TERMINALS CONVERTED INTO SINGLE INPUT/OUTPUT ELECTRIC CONDUCTIVE INTERFACE

BACKGROUND OF THE INVENTION (a) Field of the Invention

The present invention discloses an electricity storing/discharging device with multiple-layer package structure having electrode plate pair with multiple-sided electric conductive terminals converted into single input/output electric conductive interface, which is applied in a multiple-layer package structure with specific single-sided input/output and having electrode plate pair with multiple-sided input/output terminals, thereby allowing the electrode plate pair with multiple-sided electric conductive terminals to be structured as an input/output electric conductive interface through single-sided input/output electric conductive terminals having positive and negative polarities for the purpose of transferring electric energy to the exterior, or further to be connected in series, in parallel or in series and parallel for forming as a module applicable for various requirements.

(b) Description of the Prior Art

In a sealing-type package structure for the electrode plate pair of a conventional electricity storing/discharging device, the input/output electric conductive terminals having positive and negative polarity of the electrode plate pair are processed with a single-sided sealing package operation, then the input/output electric conductive terminals having positive and negative polarity are outwardly extended for forming a single input/output electric conductive interface; however, the sealing package operation for the electrode plate pair of the conventional electricity storing/discharging device is unable to allow the electrode plate pair with multiple-sided input/output electric conductive terminals to be converted into single input/output electric conductive interface.

SUMMARY OF THE INVENTION

In a sealing-type package structure for the electrode plate pair of a conventional electricity storing/discharging device, the input/output electric conductive terminals having positive and negative polarity of the electrode plate pair are processed with a single-sided sealing package operation, then the input/output electric conductive terminals having positive and negative polarity are outwardly extended for forming a single input/output electric conductive interface; however, the sealing package operation for the electrode plate pair of the conventional electricity storing/discharging device is unable to allow the electrode plate pair with multiple-sided input/output electric conductive terminals to be converted into single input/output electric conductive interface;

The present invention discloses an electricity storing/discharging device with multiple-layer package structure having electrode plate pair with multiple-sided electric conductive terminals converted into single input/output electric conductive interface, which is applied in a multiple-layer package structure with specific single-sided input/output and having electrode plate pair with multiple-sided input/output terminals, thereby allowing the electrode plate pair with multiple-sided electric conductive terminals to be structured as an input/output electric conductive interface through single-sided input/output electric conductive terminals having positive and negative polarities for the purpose of transferring electric energy to the exterior, or further to be connected in series, in parallel or in series and parallel for forming as a module applicable for various requirements.

BRIEF DESCRIPTION OF THE DRAWINGS

FIG. 9 is a schematic structural view showing the electricity storing/discharging device with multiple-layer package structure having electrode plate pair with multiple-sided electric conductive terminals converted into single input/output electric conductive interface being provided with a rectangular sheet-like lateral positive electric conductive member (109) and a lateral negative electric conductive member (110).

FIG. 10 is a lateral cross sectional view of FIG. 9 taken along A-A.

FIG. 11 is a lateral cross sectional view of FIG. 9 taken along B-B.

FIG. 12 is a schematic structural view showing the electricity storing/discharging device with multiple-layer package structure having electrode plate pair with multiple-sided electric conductive terminals converted into single input/output electric conductive interface being installed with the strip-like lateral positive electric conductive member (109) and the lateral negative electric conductive member (110).

FIG. 13 is a lateral cross sectional view of FIG. 12 taken along A-A.

FIG. 14 is a lateral cross sectional view of FIG. 12 taken along B-B.

FIG. 15 is a schematic structural view showing the electricity storing/discharging device with multiple-layer package structure having electrode plate pair with multiple-sided electric conductive terminals converted into single input/output electric conductive interface being installed with the circular sheet-like lateral positive electric conductive member (109) and the lateral negative electric conductive member (110).

FIG. 16 is a lateral cross sectional view of FIG. 15 taken along A-A.

FIG. 17 is a lateral cross sectional view of FIG. 15 taken along B-B.

FIG. 18 is a schematic structural view showing one side of the positive electrode plate (101) shown in FIG. 9 being integrally extended with the electric conductive terminal for inputting/outputting electric energy (1012) and the lateral positive electric conductive member (109) then combined with the electric conductive terminal for inputting/outputting electric energy (1011), and one side of the negative electrode plate (102) being integrally extended with the electric conductive terminal for inputting/outputting electric energy (1022) and the lateral negative electric conductive member (110) then combined with the negative electrode plate (102).

FIG. 19 is a lateral cross sectional view of FIG. 18 taken along A-A.

FIG. 20 is a lateral cross sectional view of FIG. 18 taken along B-B.

FIG. 21 is a schematic structural view showing one side of the positive electrode plate (101) shown in FIG. 12 being integrally extended with the electric conductive terminal for inputting/outputting electric energy (1012) and the lateral positive electric conductive member (109) then combined with the electric conductive terminal for inputting/outputting electric energy (1011), and one side of the negative electrode plate (102) being integrally extended with the electric conductive terminal for inputting/outputting electric energy (1022) and the lateral negative electric conductive member (110) then combined with the negative electrode plate (102).

FIG. 22 is a lateral cross sectional view of FIG. 21 taken along A-A.

FIG. 23 is a lateral cross sectional view of FIG. 21 taken along B-B.

FIG. 24 is a schematic structural view showing one side of the positive electrode plate (101) shown in FIG. 15 being integrally extended with the electric conductive terminal for inputting/outputting electric energy (1012) and the lateral positive electric conductive member (109) then combined with the electric conductive terminal for inputting/outputting electric energy (1011), and one side of the negative electrode plate (102) being integrally extended with the electric conductive terminal for inputting/outputting electric energy (1022) and the lateral negative electric conductive member (110) then combined with the negative electrode plate (102).

FIG. 25 is a lateral cross sectional view of FIG. 24 taken along A-A.

FIG. 26 is a lateral cross sectional view of FIG. 24 taken along B-B.

FIG. 27 is a schematic structural view showing the lateral positive electric conductive member (109) and the lateral negative electric conductive member (110) at two sides of the electricity storing/discharging device with multiple-layer package structure having electrode plate pair with multiple-sided electric conductive terminals converted into single input/output electric conductive interface shown in FIG. 9 passing openings (1060) of the outer auxiliary insulation package enclosed member (106) at two sides for respectively being served as an input/output electric conductive interface.

FIG. 28 is a lateral cross sectional view of FIG. 27 taken along A-A.

FIG. 29 is a lateral cross sectional view of FIG. 27 taken along B-B.

FIG. 30 is a schematic structural view showing the lateral positive electric conductive member (109) and the lateral negative electric conductive member (110) at two sides of the electricity storing/discharging device with multiple-layer package structure having electrode plate pair with multiple-sided electric conductive terminals converted into single input/output electric conductive interface shown in FIG. 12 passing openings (1060) of the outer auxiliary insulation package enclosed member (106) at two sides for respectively being served as an input/output electric conductive interface.

FIG. 31 is a lateral cross sectional view of FIG. 30 taken along A-A.

FIG. 32 is a lateral cross sectional view of FIG. 30 taken along B-B.

FIG. 39 is a schematic structural view showing the lateral positive electric conductive member (109) being installed with the lateral positive auxiliary electric conductive member (1091) and the lateral negative electric conductive member (110) being installed with the lateral negative auxiliary electric conductive member (1101) at two sides of the electricity storing/discharging device with multiple-layer package structure having electrode plate pair with multiple-sided electric conductive terminals converted into single input/output electric conductive interface shown in FIG. 12 passing openings (1060) of the outer auxiliary insulation package enclosed member (106) at two sides for respectively being served as an input/output electric conductive interface.

FIG. 40 is a lateral cross sectional view of FIG. 39 taken along A-A.

FIG. 41 is a lateral cross sectional view of FIG. 39 taken along B-B.

FIG. 42 is a schematic structural view showing the lateral positive electric conductive member (109) being installed with the lateral positive auxiliary electric conductive member (1091) and the lateral negative electric conductive member (110) being installed with the lateral negative auxiliary electric conductive member (1101) at two sides of the electricity storing/discharging device with multiple-layer package structure having electrode plate pair with multiple-sided electric conductive terminals converted into single input/output electric conductive interface shown in FIG. 15 passing openings (1060) of the outer auxiliary insulation package enclosed member (106) at two sides for respectively being served as an input/output electric conductive interface.

FIG. 43 is a lateral cross sectional view of FIG. 42 taken along A-A.

FIG. 44 is a lateral cross sectional view of FIG. 42 taken along B-B.

FIG. 51 is a schematic structural view showing the lateral positive electric conductive member (109) having the mid portion being formed with an outwardly-protruded structure and the lateral negative electric conductive member (110) having the mid portion being formed with an outwardly-protruded structure at two sides of the electricity storing/discharging device with multiple-layer package structure having electrode plate pair with multiple-sided electric conductive terminals converted into single input/output electric conductive interface shown in FIG. 15 passing openings (1060) of the outer auxiliary insulation package enclosed member (106) at two sides for respectively being served as an input/output electric conductive interface.

FIG. 52 is a lateral cross sectional view of FIG. 51 taken along A-A.

FIG. 53 is a lateral cross sectional view of FIG. 51 taken along B-B.

FIG. 54 is a schematic structural view showing the electricity storing/discharging cells being disposed inside the housing (120) for forming as a module according to the present invention.

FIG. 55 is a lateral structural view of FIG. 54.

DESCRIPTION OF MAIN COMPONENT SYMBOLS

Figure 1:
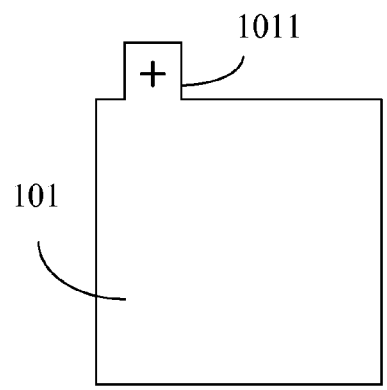
FIG. 1 is a schematic structural view showing a conventional electrode plate having single-sided electric energy transferring terminal.

101: Positive electrode plate
102: Negative electrode plate
104: Separator
105: Insulation package enclose member
1051, 1052: Sealing zone
106: Outer auxiliary insulation package enclose member
1060: Opening of the outer auxiliary insulation package enclosed member (106)
1061: Outer sealing zone
109: Lateral positive electric conductive member
1091: Lateral positive auxiliary electric conductive member
110: Lateral negative electric conductive member
1101: Lateral negative auxiliary electric conductive member
120: Housing
1011, 1011', 1012, 1012', 1013, 1013', 1014, 1014', 1021, 1022, 1023, 1024: Electric conductive terminal for inputting/outputting electric energy

DETAILED DESCRIPTION OF THE PREFERRED EMBODIMENTS

A electrode plate is a fundamental component for structuring a primary cell or a rechargeable secondary cell or a capacitor or a super capacitor and a fuel cell for outputting electric energy, the configuration thereof is often composed of electrode plates having various geometric shapes, and at least a positive electrode plate and at least a negative electrode plate having the same or different quantity are formed as an electrode plate pair so as to structure an electricity storing/discharging cell, and at least two electricity storing/discharging cells are adopted for being homopolarity connected in parallel or normal-polarity connected in series or being connected in series then in parallel or connected in parallel then in series for forming as a module applicable for various requirements.

It is well known that the electrode plate applied in the above-mentioned primary cell or rechargeable secondary cell or capacitor or super capacitor and fuel cell for outputting electric energy is mainly formed in a circular or rectangular shape or other geometric shapes according to actual needs, and the electrode plate and the electric conductive terminal for inputting/outputting electric energy are often exposed outside a sealed housing, when the electrode plate pair with multiple-sided input/output electric conductive terminals are adopted, an additional electric conductive member has to be provided for connection, as such, inconvenience in connection is caused when a soft package material is adopted.

The present invention discloses an electricity storing/discharging device with multiple-layer package structure having electrode plate pair with multiple-sided electric conductive terminals converted into single input/output electric conductive interface, which is applied in a multiple-layer package structure with specific single-sided input/output and having electrode plate pair with multiple-sided input/output terminals, thereby allowing the electrode plate pair with multiple-sided electric conductive terminals to be structured as an input/output electric conductive interface through single-sided input/output electric conductive terminals having positive and negative polarities for the purpose of transferring electric energy to the exterior, or further to be connected in series, in parallel or in series and parallel for forming as a module applicable for various requirements.

According to the electricity storing/discharging device with multiple-layer package structure having electrode plate pair with multiple-sided electric conductive terminals converted into single input/output electric conductive interface, the electrode plate pair with multiple-sided input/output electric conductive terminals and the soft package material or rigid package material are able to be adopted at the same time for forming as a specific package structure, so a single-sided input/output electric conductive terminal having positive and negative polarity for transferring electric energy to the exterior can be structured.

Moreover, in a sealing-type package structure for the electrode plate pair of a conventional electricity storing/discharging device, the input/output electric conductive terminals having positive and negative polarity of the electrode plate pair are processed with a single-sided sealing package operation, then the input/output electric conductive terminals having positive and negative polarity are outwardly extended for forming a single input/output electric conductive interface; however, the sealing package operation for the electrode plate pair of the conventional electricity storing/discharging device is unable to allow the electrode plate pair with multiple-sided input/output electric conductive terminals to be converted into single input/output electric conductive interface; a positive electrode plate is adopted for illustration (the same illustration can be applied to a negative electrode plate therefore not provided), as followings:

FIG. 1 is a schematic structural view showing a conventional electrode plate having single-sided electric energy transferring terminal.

As shown in FIG. 1, the electrode plate formed in a quadrilateral shape is provided as an example, and the main configuration is that one side of the quadrilateral electrode plate is outwardly extended for forming the electric conductive terminal for inputting/outputting electric energy.

Figure 2:
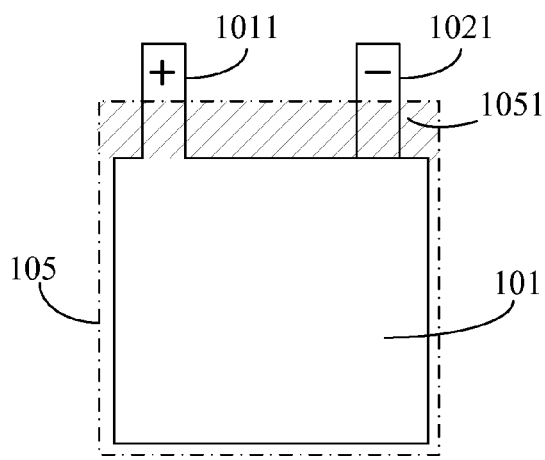
FIG. 2 is a schematic structural view showing a conventional electrode plate pair with single-sided electric energy transferring terminal being formed as an electricity storing/discharging cell.

FIG. 2 is a schematic structural view showing a conventional electrode plate pair with single-sided electric energy transferring terminal being formed as an electricity storing/discharging cell.

Figure 3:
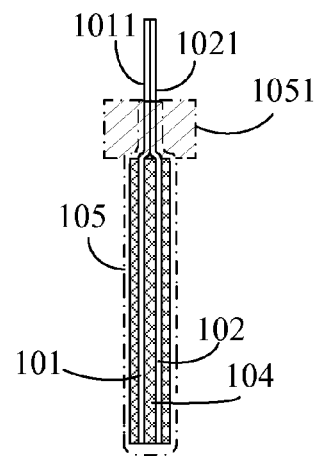
FIG. 3 is a lateral cross sectional view of FIG. 2.

FIG. 3 is a lateral cross sectional view of FIG. 2.

As shown in FIG. 2 and FIG. 3, the main configuration is that a quadrilateral positive electrode plate (101) having single-sided electric conductive terminal for inputting/outputting electric energy (1011) and a negative electrode plate (102) having single-sided electric conductive terminal for inputting/outputting electric energy (1021) are provided, and an separator is provided between the positive and the negative electrode plates, and the separator is directly installed or clamped at the exterior after an electrolyte solution or an electrolyte material is filled in then is disposed in an insulation package enclose member (105), and the electric conductive terminals for inputting/outputting electric energy (1011), (1012) are outwardly extended through a sealing zone (1051) from another side of the insulation package enclose member (105).

Figure 4:
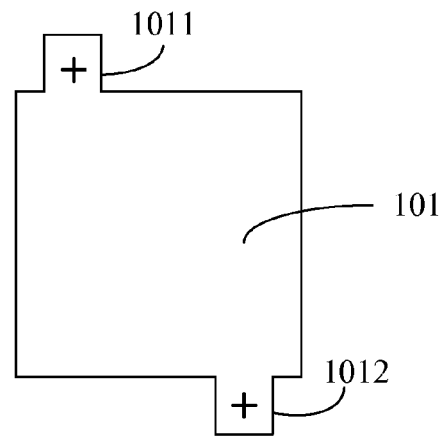
FIG. 4 is the first embodiment showing a conventional electrode plate having multiple-sided electric energy transferring terminals.

FIG. 4 is the first embodiment showing a conventional electrode plate having multiple-sided electric energy transferring terminals.

As shown in FIG. 4, the main configuration is that end portions defined at two opposite sides of the quadrilateral positive electrode plate (101) are respectively formed with an electric conductive terminal for inputting/outputting electric energy (1011), (1012).

Figure 5:
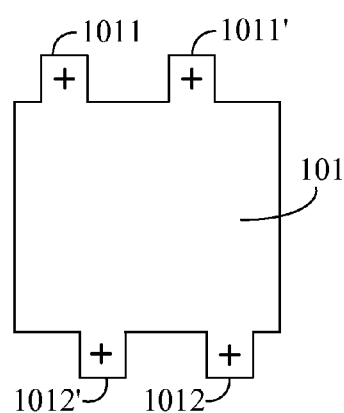
FIG. 5 is the second embodiment showing a conventional electrode plate having multiple-sided electric energy transferring terminals.

FIG. 5 is the second embodiment showing a conventional electrode plate having multiple-sided electric energy transferring terminals.

As shown in FIG. 5, the main configuration is that two opposite sides of the quadrilateral positive electrode plate (101) are respectively formed with two electric conductive terminals for inputting/outputting electric energy (1011), (1011') and two electric conductive terminals for inputting/outputting electric energy (1012), (1012'), wherein the electric conductive terminals for inputting/outputting electric energy (1011), (1011') formed at one side and the electric conductive terminals for inputting/outputting electric energy (1012), (1012') formed at the opposite side are staggeringly arranged.

Figure 6:
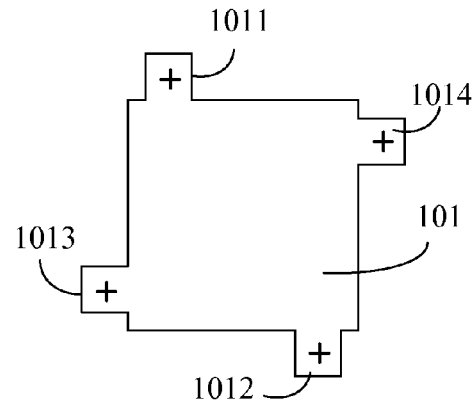
FIG. 6 is the third embodiment showing a conventional electrode plate having multiple-sided electric energy transferring terminals.

FIG. 6 is the third embodiment showing a conventional electrode plate having multiple-sided electric energy transferring terminals.

As shown in FIG. 6, four sides of the quadrilateral positive electrode plate (101) are respectively formed with an electric conductive terminal for inputting/outputting electric energy (1011), (1012), (1013), (1014), wherein the electric conductive terminals for inputting/outputting electric energy arranged at opposite sides are staggeringly arranged.

Figure 7:
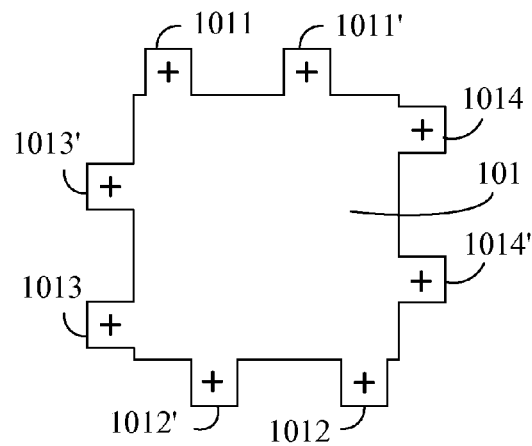
FIG. 7 is a fourth embodiment showing an electrode plate having multiple-sided electric energy transferring terminals.

FIG. 7 is a fourth embodiment showing an electrode plate having multiple-sided electric energy transferring terminals.

As shown in FIG. 7, a first side of the quadrilateral positive electrode plate (101) is formed with two electric conductive terminals for inputting/outputting electric energy (1011), (1011'), a second side thereof is formed with two electric conductive terminals for inputting/outputting electric energy (1012), (1012'), a third side thereof is formed with two electric conductive terminals for inputting/outputting electric energy (1013), (1013') and a fourth side thereof is formed with two electric conductive terminals for inputting/outputting electric energy (1014), (1014'), wherein the electric conductive terminals for inputting/outputting electric energy arranged at opposite sides are staggeringly arranged.

Figure 8:
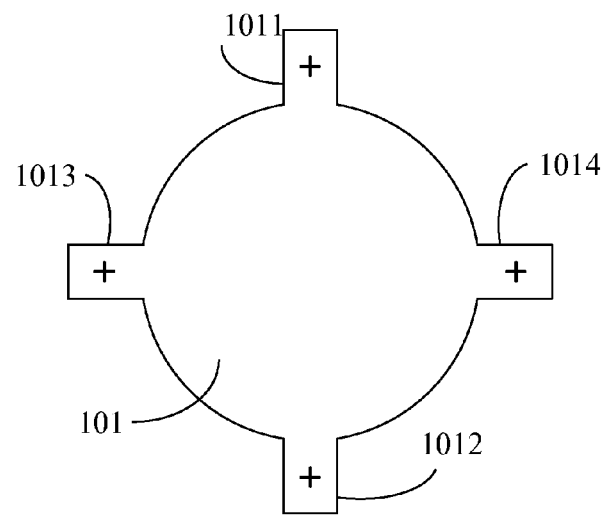
FIG. 8 is an embodiment showing a conventional circular electrode plate having electric energy transferring terminals.

FIG. 8 is a schematic structural view showing a conventional circular electrode plate having electric energy transferring terminals.

As shown in FIG. 8, the main configuration is that the periphery of the circular electrode plate is radially formed with electric conductive terminals for inputting/outputting electric energy (1011), (1012), (1013), (1014).

Other various geometric shapes have substantially the same feature, therefore no further illustration is provided.

The present invention provides an electricity storing/discharging device with multiple-layer package structure having electrode plate pair with multiple-sided electric conductive terminals converted into single input/output electric conductive interface, which is applied in a multiple-layer package structure with specific single-sided input/output and having electrode plate pair with multiple-sided input/output terminals, thereby allowing the electrode plate pair with multiple-sided electric conductive terminals to be structured as an input/output electric conductive interface through single-sided input/output electric conductive terminals having positive and negative polarities for the purpose of transferring electric energy to the exterior, or further to be connected in series, in parallel or in series and parallel for forming as a module applicable for various requirements; because the shapes and types of electrode plates can be varied according to actual needs, a rectangular electrode plate is adopted herein for illustration, as followings:

FIG. 9 is a schematic structural view showing the electricity storing/discharging device with multiple-layer package structure having electrode plate pair with multiple-sided electric conductive terminals converted into single input/output electric conductive interface being provided with a rectangular sheet-like lateral positive electric conductive member (109) and a lateral negative electric conductive member (110).

FIG. 10 is a lateral cross sectional view of FIG. 9 taken along A-A.

FIG. 11 is a lateral cross sectional view of FIG. 9 taken along B-B.

As shown in FIG. 9, FIG. 10 and FIG. 11, mainly consists:

positive electrode plate (101): composed of one or more than one of sheet-like or film-like quadrilateral positive electrode plates, opposite sides of the positive electrode plate are respectively formed with at least an electric conductive terminal for inputting/outputting electric energy, and the surface of the positive electrode plate is provided with an electrochemical material;

negative electrode plate (102): composed of one or more than one of sheet-like or film-like quadrilateral negative electrode plates, opposite sides of the negative electrode plate are respectively formed with at least an electric conductive terminal for inputting/outputting electric energy, and the surface of the negative electrode plate is provided with an electrochemical material;

separator (104): formed by a thin film having microporous or porous property and mainly made of PP or PE, disposed between the positive and the negative electrode plates, and the main function thereof is to isolate the positive and the negative electrode plates for preventing the self-discharge of the cell and the short circuit between the two polarities, and installed between electrode plates having different polarities and installed at a lateral side of the electrode plate according to actual needs;

Opposite sides of the quadrilateral electrode plate are respectively and outwardly extended with one or more input/output terminals for transferring electric energy, and the separator is disposed between one or more of the positive electrode plates and one or more of the negative electrode plates having the same or different quantity, and the electrode plates having different polarities are staggeringly stacked for forming as an electrode plate pair; and when a plurality of the electrode plates having the same polarity are provided, the input/output terminals having the same polarity for transferring electric energy and formed at the same side of each of the electrode plates having the same polarity are conductive electrically connected in parallel;

insulation package enclosed member (105): made of a soft or rigid package material having insulation property such as an aluminum laminated film, the periphery of the insulation package enclosed member (105) is formed in a sealed hollow sleeve status, and openings formed at two sides allow the positive electrode plate (101) and the negative electrode plate (102) having the separator (104) clamped in between to be disposed, one opening of the insulation package enclosed member (105) allows the electric conductive terminal for inputting/outputting electric energy (1011) and the electric conductive terminal for inputting/outputting electric energy (1021) to be exposed, and the insulation package enclosed member (105) is processed for forming a sealing zone (1051) so as to seal the portions of the electric conductive terminal for inputting/outputting electric energy (1011) and the electric conductive terminal for inputting/outputting electric energy (1021) defined close to the electrode plate, and the distal ends of the electric conductive terminal for inputting/outputting electric energy (1011) and the electric conductive terminal for inputting/outputting electric energy (1021) are exposed at the same side, an electrolyte solution or an electrolyte material is filled in the insulation package enclosed member (105), the other opening allows the electric conductive terminal for inputting/outputting electric energy (1012) and the electric conductive terminal for inputting/outputting electric energy (1022) to be exposed, and the insulation package enclosed member (105) is processed for forming a sealing zone (1052) so as to seal the portions of the electric conductive terminal for inputting/outputting electric energy (1012) and the electric conductive terminal for inputting/outputting electric energy (1022) defined close to the electrode plate, and the distal ends of the electric conductive terminal for inputting/outputting electric energy (1012) and the electric conductive terminal for inputting/outputting electric energy (1022) are exposed and inwardly bent along the exterior of the sealing zone (1052) of the insulation package enclosed member (105) thereby being respectively connected with the lateral positive electric conductive member (109) and the lateral negative electric conductive member (110), wherein the electric conductive terminal for inputting/outputting electric energy (1012) is conductive electrically connected to one end of the lateral positive electric conductive member (109), and the other end of the lateral positive electric conductive member (109) is conductive electrically connected to the electric conductive terminal for inputting/outputting electric energy (1011) thereby forming a parallel conductive electrical connection with positive polarity; the electric conductive terminal for inputting/outputting electric energy (1022) is conductive electrically connected to one end of the lateral negative electric conductive member (110), and the other end of the lateral negative electric conductive member (110) is conductive electrically connected to the electric conductive terminal for inputting/outputting electric energy (1021) thereby forming a parallel conductive electrical connection with negative polarity, so an electricity storing/discharging cell is structured;

lateral positive electric conductive member (109): made of an electric conductive material and disposed at one side of the insulation package enclosed member (105);

lateral negative electric conductive member (110): made of an electric conductive material and disposed at another side of the insulation package enclosed member (105);

The above-mentioned lateral positive electric conductive member (109) and the lateral negative electric conductive member (110) include being composed of an electric conductive member formed in a rectangular sheet-like, or strip-like or circular sheet-like status, and the top and the bottom ends thereof are respectively extended with an electric conductive strip, the electric conductive strip respectively extended from the top and the bottom ends of the lateral positive electric conductive member (109) are then respectively and conductive electrically connected to the electric conductive terminal for inputting/outputting electric energy (1011) and the electric conductive terminal for inputting/outputting electric energy (1012) having positive polarity, and the electric conductive strip respectively extended from the top and the bottom ends of the lateral negative electric conductive member (110) are then respectively and conductive electrically connected to the electric conductive terminal for inputting/outputting electric energy (1021) and the electric conductive terminal for inputting/outputting electric energy (1022) having negative polarity;

outer auxiliary insulation package enclosed member (106): made of a soft or rigid package material having insulation property such as an aluminum laminated film and formed in a bag-like status having three sides being sealed and allowing the electricity storing/discharging cell packaged by the insulation package enclosed member (105) to be disposed, and the electric conductive terminal for inputting/outputting electric energy (1011) and the electric conductive terminal for inputting/outputting electric energy (1021) of the electricity storing/discharging cell are exposed through openings formed in the outer auxiliary insulation package enclosed member (106), and through the outer auxiliary insulation package enclosed member (106) being processed for forming an outer sealing zone (1061) and the insulation package enclosed member (105) being processed for forming the sealing zone (1051), the mid portions of the electric conductive terminal for inputting/outputting electric energy (1011) and the electric conductive terminal for inputting/outputting electric energy (1021) are sealed, and the distal portions of the electric conductive terminal for inputting/outputting electric energy (1011) and the electric conductive terminal for inputting/outputting electric energy (1021) are exposed at the same side for forming as electric conductive terminals for inputting/outputting electric energy to the exterior, thereby structuring the electricity storing/discharging device with multiple-layer package structure having electrode plate pair with multiple-sided electric conductive terminals converted into single input/output electric conductive interface.

FIG. 12 is a schematic structural view showing the electricity storing/discharging device with multiple-layer package structure having electrode plate pair with multiple-sided electric conductive terminals converted into single input/output electric conductive interface being installed with the strip-like lateral positive electric conductive member (109) and the lateral negative electric conductive member (110).

FIG. 13 is a lateral cross sectional view of FIG. 12 taken along A-A.

FIG. 14 is a lateral cross sectional view of FIG. 12 taken along B-B.

As shown in FIG. 12, FIG. 13 and FIG. 14, the electricity storing/discharging device with multiple-layer package structure having electrode plate pair with multiple-sided electric conductive terminals converted into single input/output electric conductive interface being installed with the strip-like lateral positive electric conductive member (109) and the lateral negative electric conductive member (110).

FIG. 15 is a schematic structural view showing the electricity storing/discharging device with multiple-layer package structure having electrode plate pair with multiple-sided electric conductive terminals converted into single input/output electric conductive interface being installed with the circular sheet-like lateral positive electric conductive member (109) and the lateral negative electric conductive member (110).

FIG. 16 is a lateral cross sectional view of FIG. 15 taken along A-A.

FIG. 17 is a lateral cross sectional view of FIG. 15 taken along B-B.

As shown in FIG. 15, FIG. 16 and FIG. 17, the electricity storing/discharging device with multiple-layer package structure having electrode plate pair with multiple-sided electric conductive terminals converted into single input/output electric conductive interface being installed with the circular sheet-like lateral positive electric conductive member (109) and the lateral negative electric conductive member (110).

According to each embodiment disclosed above, one side of the positive electrode plate (101) can be further integrally extended with the electric conductive terminal for inputting/outputting electric energy (1012) and the lateral positive electric conductive member (109) then combined with the electric conductive terminal for inputting/outputting electric energy (1011), and one side of the negative electrode plate (102) can be further integrally extended with the electric conductive terminal for inputting/outputting electric energy (1022) and the lateral negative electric conductive member (110) then combined with the negative electrode plate (102) thereby reducing the processing points for combination, examples are provided as followings:

FIG. 18 is a schematic structural view showing one side of the positive electrode plate (101) shown in FIG. 9 being integrally extended with the electric conductive terminal for inputting/outputting electric energy (1012) and the lateral positive electric conductive member (109) then combined with the electric conductive terminal for inputting/outputting electric energy (1011), and one side of the negative electrode plate (102) being integrally extended with the electric conductive terminal for inputting/outputting electric energy (1022) and the lateral negative electric conductive member (110) then combined with the negative electrode plate (102).

FIG. 19 is a lateral cross sectional view of FIG. 18 taken along A-A.

FIG. 20 is a lateral cross sectional view of FIG. 18 taken along B-B.

As shown in FIG. 18, FIG. 19 and FIG. 20, the main characteristic is that one side of the positive electrode plate (101) is integrally extended with the electric conductive terminal for inputting/outputting electric energy (1012) and the lateral positive electric conductive member (109) then combined with the electric conductive terminal for inputting/outputting electric energy (1011), and one side of the negative electrode plate (102) is integrally extended with the electric conductive terminal for inputting/outputting electric energy (1022) and the lateral negative electric conductive member (110) then combined with the negative electrode plate (102), thereby structuring a single input/output electric conductive interface.

FIG. 21 is a schematic structural view showing one side of the positive electrode plate (101) shown in FIG. 12 being integrally extended with the electric conductive terminal for inputting/outputting electric energy (1012) and the lateral positive electric conductive member (109) then combined with the electric conductive terminal for inputting/outputting electric energy (1011), and one side of the negative electrode plate (102) being integrally extended with the electric conductive terminal for inputting/outputting electric energy (1022) and the lateral negative electric conductive member (110) then combined with the negative electrode plate (102).

FIG. 22 is a lateral cross sectional view of FIG. 21 taken along A-A.

FIG. 23 is a lateral cross sectional view of FIG. 21 taken along B-B.

As shown in FIG. 21, FIG. 22 and FIG. 23, the main characteristic is that one side of the positive electrode plate (101) is integrally extended with the electric conductive terminal for inputting/outputting electric energy (1012) and the lateral positive electric conductive member (109) then combined with the electric conductive terminal for inputting/outputting electric energy (1011), and one side of the negative electrode plate (102) is integrally extended with the electric conductive terminal for inputting/outputting electric energy (1022) and the lateral negative electric conductive member (110) then combined with the negative electrode plate (102), thereby structuring a single input/output electric conductive interface.

FIG. 24 is a schematic structural view showing one side of the positive electrode plate (101) shown in FIG. 15 being integrally extended with the electric conductive terminal for inputting/outputting electric energy (1012) and the lateral positive electric conductive member (109) then combined with the electric conductive terminal for inputting/outputting electric energy (1011), and one side of the negative electrode plate (102) being integrally extended with the electric conductive terminal for inputting/outputting electric energy (1022) and the lateral negative electric conductive member (110) then combined with the negative electrode plate (102).

FIG. 25 is a lateral cross sectional view of FIG. 24 taken along A-A.

FIG. 26 is a lateral cross sectional view of FIG. 24 taken along B-B.

As shown in FIG. 24, FIG. 25 and FIG. 26, the main characteristic is that one side of the positive electrode plate (101) is integrally extended with the electric conductive terminal for inputting/outputting electric energy (1012) and the lateral positive electric conductive member (109) then combined with the electric conductive terminal for inputting/outputting electric energy (1011), and one side of the negative electrode plate (102) is integrally extended with the electric conductive terminal for inputting/outputting electric energy (1022) and the lateral negative electric conductive member (110) then combined with the negative electrode plate (102), thereby structuring a single input/output electric conductive interface.

According to the above-mentioned embodiments, the lateral positive electric conductive member (109) and the lateral negative electric conductive member (110) at two sides of the electricity storing/discharging device with multiple-layer package structure having electrode plate pair with multiple-sided electric conductive terminals converted into single input/output electric conductive interface can be served as an input/output electric conductive interface for being individually used, or connected in series, in parallel or in series and parallel, the configuration includes:

externally exposed electric conductive surfaces of the lateral positive electric conductive member (109) and the lateral negative electric conductive member (110) are directly formed as the input/output electric conductive interfaces;

the externally exposed surface of the lateral positive electric conductive member (109) is provided with a lateral positive auxiliary electric conductive member (1091), and the externally exposed surface of the lateral negative electric conductive member (110) is provided with a lateral negative auxiliary electric conductive member (1101) for structuring the input/output electric conductive interfaces.

one or more locations defined at the mid portion of the lateral positive electric conductive member (109) are formed with an outwardly-protruded structure and one or more locations defined at the mid portion of the lateral negative electric conductive member (110) are formed with an outwardly-protruded structure, thereby structuring the input/output electric conductive interfaces.

Examples are provided as followings:

FIG. 27 is a schematic structural view showing the lateral positive electric conductive member (109) and the lateral negative electric conductive member (110) at two sides of the electricity storing/discharging device with multiple-layer package structure having electrode plate pair with multiple-sided electric conductive terminals converted into single input/output electric conductive interface shown in FIG. 9 passing openings (1060) of the outer auxiliary insulation package enclosed member (106) at two sides for respectively being served as an input/output electric conductive interface.

FIG. 28 is a lateral cross sectional view of FIG. 27 taken along A-A.

FIG. 29 is a lateral cross sectional view of FIG. 27 taken along B-B.

As shown in FIG. 27, FIG. 28 and FIG. 29, the main characteristic is that the lateral positive electric conductive member (109) and the lateral negative electric conductive member (110) at two sides of the electricity storing/discharging device with multiple-layer package structure having electrode plate pair with multiple-sided electric conductive terminals converted into single input/output electric conductive interface pass the openings (1060) of the outer auxiliary insulation package enclosed member (106) at two sides for respectively being served as the input/output electric conductive interface.

FIG. 30 is a schematic structural view showing the lateral positive electric conductive member (109) and the lateral negative electric conductive member (110) at two sides of the electricity storing/discharging device with multiple-layer package structure having electrode plate pair with multiple-sided electric conductive terminals converted into single input/output electric conductive interface shown in FIG. 12 passing openings (1060) of the outer auxiliary insulation package enclosed member (106) at two sides for respectively being served as an input/output electric conductive interface.

FIG. 31 is a lateral cross sectional view of FIG. 30 taken along A-A.

FIG. 32 is a lateral cross sectional view of FIG. 30 taken along B-B.

As shown in FIG. 30, FIG. 31 and FIG. 32, the main characteristic is that the lateral positive electric conductive member (109) and the lateral negative electric conductive member (110) at two sides of the electricity storing/discharging device with multiple-layer package structure having electrode plate pair with multiple-sided electric conductive terminals converted into single input/output electric conductive interface pass the openings (1060) of the outer auxiliary insulation package enclosed member (106) at two sides for respectively being served as the input/output electric conductive interface.

Figure 33:
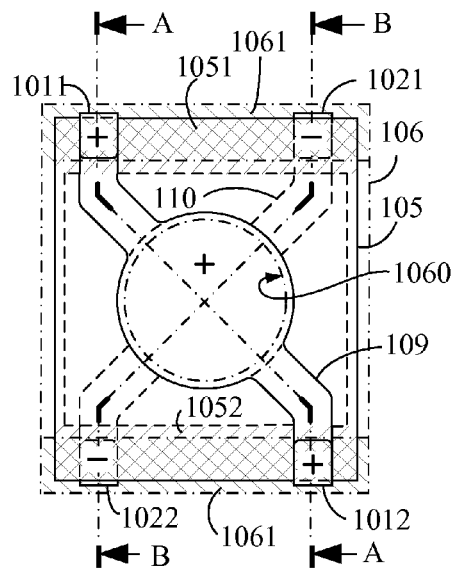
FIG. 33 is a schematic structural view showing the lateral positive electric conductive member (109) and the lateral negative electric conductive member (110) at two sides of the electricity storing/discharging device with multiple-layer package structure having electrode plate pair with multiple-sided electric conductive terminals converted into single input/output electric conductive interface shown in FIG. 15 passing openings (1060) of the outer auxiliary insulation package enclosed member (106) at two sides for respectively being served as an input/output electric conductive interface.

FIG. 33 is a schematic structural view showing the lateral positive electric conductive member (109) and the lateral negative electric conductive member (110) at two sides of the electricity storing/discharging device with multiple-layer package structure having electrode plate pair with multiple-sided electric conductive terminals converted into single input/output electric conductive interface shown in FIG. 15 passing openings (1060) of the outer auxiliary insulation package enclosed member (106) at two sides for respectively being served as an input/output electric conductive interface.

Figure 34:
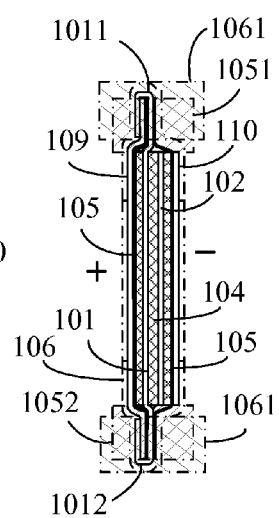
FIG. 34 is a lateral cross sectional view of FIG. 33 taken along A-A.

FIG. 34 is a lateral cross sectional view of FIG. 33 taken along A-A.

Figure 35:
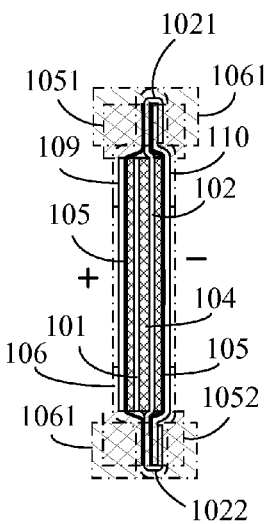
FIG. 35 is a lateral cross sectional view of FIG. 33 taken along B-B.

FIG. 35 is a lateral cross sectional view of FIG. 33 taken along B-B.

As shown in FIG. 33, FIG. 34 and FIG. 35, the main characteristic is that the lateral positive electric conductive member (109) and the lateral negative electric conductive member (110) at two sides of the electricity storing/discharging device with multiple-layer package structure having electrode plate pair with multiple-sided electric conductive terminals converted into single input/output electric conductive interface pass the openings (1060) of the outer auxiliary insulation package enclosed member (106) at two sides for respectively being served as the input/output electric conductive interface.

Figure 36:
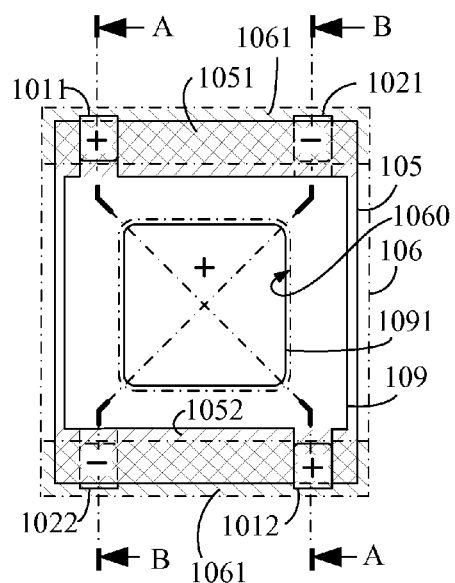
FIG. 36 is a schematic structural view showing the lateral positive electric conductive member (109) being installed with the lateral positive auxiliary electric conductive member (1091) and the lateral negative electric conductive member (110) being installed with the lateral negative auxiliary electric conductive member (1101) at two sides of the electricity storing/discharging device with multiple-layer package structure having electrode plate pair with multiple-sided electric conductive terminals converted into single input/output electric conductive interface shown in FIG. 9 passing openings (1060) of the outer auxiliary insulation package enclosed member (106) at two sides for respectively being served as an input/output electric conductive interface.

FIG. 36 is a schematic structural view showing the lateral positive electric conductive member (109) being installed with the lateral positive auxiliary electric conductive member (1091) and the lateral negative electric conductive member (110) being installed with the lateral negative auxiliary electric conductive member (1101) at two sides of the electricity storing/discharging device with multiple-layer package structure having electrode plate pair with multiple-sided electric conductive terminals converted into single input/output electric conductive interface shown in FIG. 9 passing openings (1060) of the outer auxiliary insulation package enclosed member (106) at two sides for respectively being served as an input/output electric conductive interface.

Figure 37:
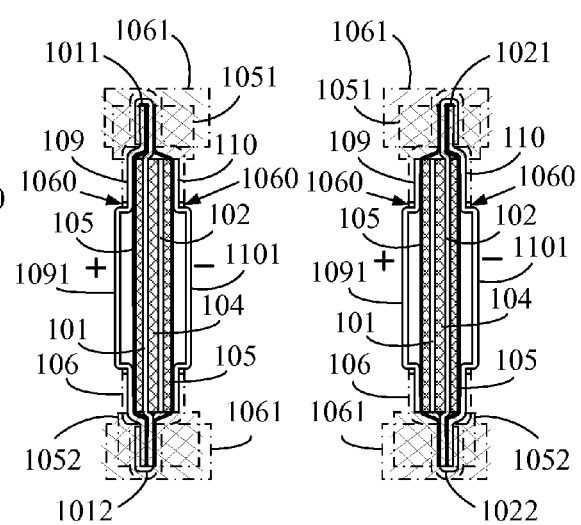
FIG. 37 is a lateral cross sectional view of FIG. 36 taken along A-A.

FIG. 37 is a lateral cross sectional view of FIG. 36 taken along A-A.

Figure 38:
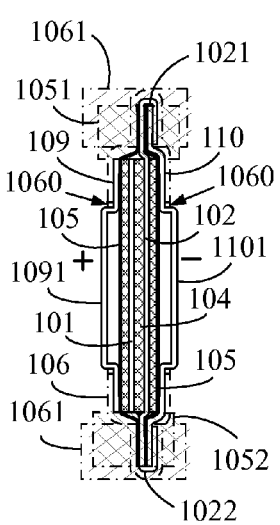
FIG. 38 is a lateral cross sectional view of FIG. 36 taken along B-B.

FIG. 38 is a lateral cross sectional view of FIG. 36 taken along B-B.

As shown in FIG. 36, FIG. 37 and FIG. 38, the main characteristic is that the lateral positive electric conductive member (109) being installed with the lateral positive auxiliary electric conductive member (1091) and the lateral negative electric conductive member (110) being installed with the lateral negative auxiliary electric conductive member (1101) at two sides of the electricity storing/discharging device with multiple-layer package structure having electrode plate pair with multiple-sided electric conductive terminals converted into single input/output electric conductive interface pass the openings (1060) of the outer auxiliary insulation package enclosed member (106) at two sides for respectively being served as the input/output electric conductive interface.

FIG. 39 is a schematic structural view showing the lateral positive electric conductive member (109) being installed with the lateral positive auxiliary electric conductive member (1091) and the lateral negative electric conductive member (110) being installed with the lateral negative auxiliary electric conductive member (1101) at two sides of the electricity storing/discharging device with multiple-layer package structure having electrode plate pair with multiple-sided electric conductive terminals converted into single input/output electric conductive interface shown in FIG. 12 passing openings (1060) of the outer auxiliary insulation package enclosed member (106) at two sides for respectively being served as an input/output electric conductive interface.

FIG. 40 is a lateral cross sectional view of FIG. 39 taken along A-A.

FIG. 41 is a lateral cross sectional view of FIG. 39 taken along B-B.

As shown in FIG. 39, FIG. 40 and FIG. 41, the main characteristic is that the lateral positive electric conductive member (109) being installed with the lateral positive auxiliary electric conductive member (1091) and the lateral negative electric conductive member (110) being installed with the lateral negative auxiliary electric conductive member (1101) at two sides of the electricity storing/discharging device with multiple-layer package structure having electrode plate pair with multiple-sided electric conductive terminals converted into single input/output electric conductive interface pass the openings (1060) of the outer auxiliary insulation package enclosed member (106) at two sides for respectively being served as the input/output electric conductive interface.

FIG. 42 is a schematic structural view showing the lateral positive electric conductive member (109) being installed with the lateral positive auxiliary electric conductive member (1091) and the lateral negative electric conductive member (110) being installed with the lateral negative auxiliary electric conductive member (1101) at two sides of the electricity storing/discharging device with multiple-layer package structure having electrode plate pair with multiple-sided electric conductive terminals converted into single input/output electric conductive interface shown in FIG. 15 passing openings (1060) of the outer auxiliary insulation package enclosed member (106) at two sides for respectively being served as an input/output electric conductive interface.

FIG. 43 is a lateral cross sectional view of FIG. 42 taken along A-A.

FIG. 44 is a lateral cross sectional view of FIG. 42 taken along B-B.

As shown in FIG. 42, FIG. 43 and FIG. 44, the main characteristic is that the lateral positive electric conductive member (109) being installed with the lateral positive auxiliary electric conductive member (1091) and the lateral negative electric conductive member (110) being installed with the lateral negative auxiliary electric conductive member (1101) at two sides of the electricity storing/discharging device with multiple-layer package structure having electrode plate pair with multiple-sided electric conductive terminals converted into single input/output electric conductive interface pass the openings (1060) of the outer auxiliary insulation package enclosed member (106) at two sides for respectively being served as the input/output electric conductive interface.

Figure 45:
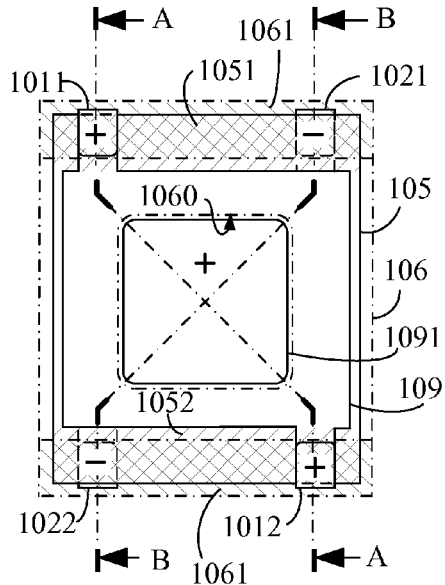
FIG. 45 is a schematic structural view showing the lateral positive electric conductive member (109) having the mid portion being formed with an outwardly-protruded structure and the lateral negative electric conductive member (110) having the mid portion being formed with an outwardly-protruded structure at two sides of the electricity storing/discharging device with multiple-layer package structure having electrode plate pair with multiple-sided electric conductive terminals converted into single input/output electric conductive interface shown in FIG. 9 passing openings (1060) of the outer auxiliary insulation package enclosed member (106) at two sides for respectively being served as an input/output electric conductive interface.

FIG. 45 is a schematic structural view showing the lateral positive electric conductive member (109) having the mid portion being formed with an outwardly-protruded structure and the lateral negative electric conductive member (110) having the mid portion being formed with an outwardly-protruded structure at two sides of the electricity storing/discharging device with multiple-layer package structure having electrode plate pair with multiple-sided electric conductive terminals converted into single input/output electric conductive interface shown in FIG. 9 passing openings (1060) of the outer auxiliary insulation package enclosed member (106) at two sides for respectively being served as an input/output electric conductive interface.

Figure 46:
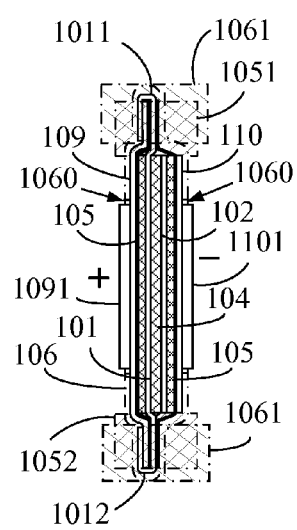
FIG. 46 is a lateral cross sectional view of FIG. 45 taken along A-A.

FIG. 46 is a lateral cross sectional view of FIG. 45 taken along A-A.

Figure 47:
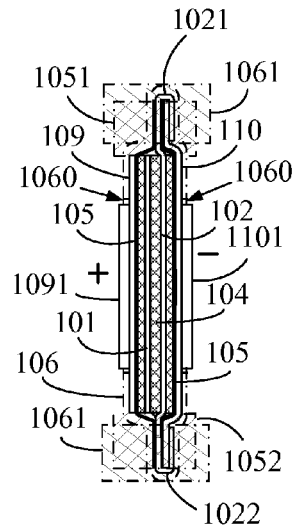
FIG. 47 is a lateral cross sectional view of FIG. 45 taken along B-B.

FIG. 47 is a lateral cross sectional view of FIG. 45 taken along B-B.

As shown in FIG. 45, FIG. 46 and FIG. 47, the main characteristic is that the lateral positive electric conductive member (109) having the mid portion being formed with an outwardly-protruded structure and the lateral negative electric conductive member (110) having the mid portion being formed with an outwardly-protruded structure at two sides of the electricity storing/discharging device with multiple-layer package structure having electrode plate pair with multiple-sided electric conductive terminals converted into single input/output electric conductive interface pass the openings (1060) of the outer auxiliary insulation package enclosed member (106) at two sides for respectively being served as the input/output electric conductive interface.

Figure 48:
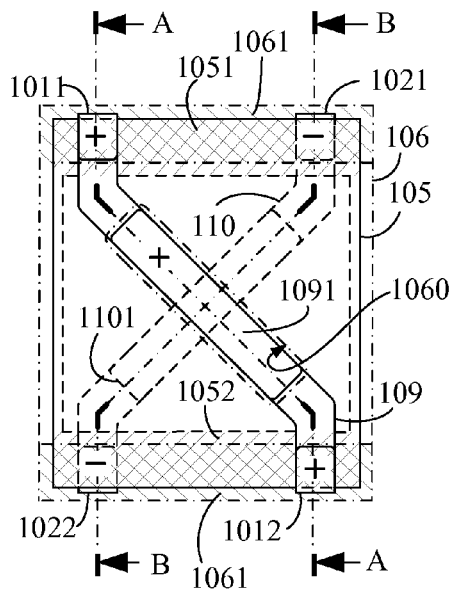
FIG. 48 is a schematic structural view showing the lateral positive electric conductive member (109) having the mid portion being formed with an outwardly-protruded structure and the lateral negative electric conductive member (110) having the mid portion being formed with an outwardly-protruded structure at two sides of the electricity storing/discharging device with multiple-layer package structure having electrode plate pair with multiple-sided electric conductive terminals converted into single input/output electric conductive interface shown in FIG. 12 passing openings (1060) of the outer auxiliary insulation package enclosed member (106) at two sides for respectively being served as an input/output electric conductive interface.

FIG. 48 is a schematic structural view showing the lateral positive electric conductive member (109) having the mid portion being formed with an outwardly-protruded structure and the lateral negative electric conductive member (110) having the mid portion being formed with an outwardly-protruded structure at two sides of the electricity storing/discharging device with multiple-layer package structure having electrode plate pair with multiple-sided electric conductive terminals converted into single input/output electric conductive interface shown in FIG. 12 passing openings (1060) of the outer auxiliary insulation package enclosed member (106) at two sides for respectively being served as an input/output electric conductive interface.

Figure 49:
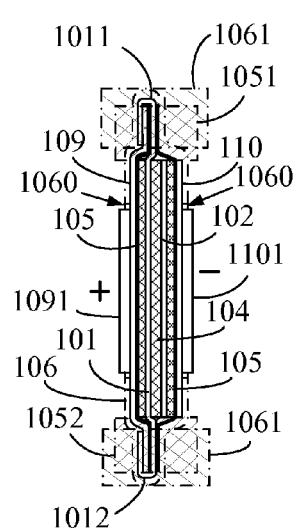
FIG. 49 is a lateral cross sectional view of FIG. 48 taken along A-A.

FIG. 49 is a lateral cross sectional view of FIG. 48 taken along A-A.

Figure 50:
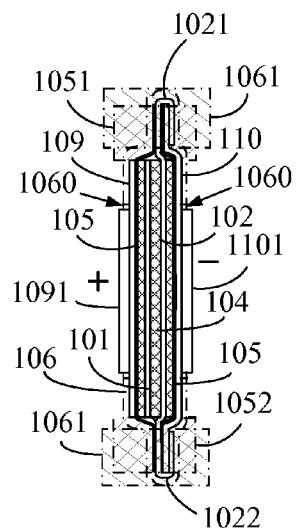
FIG. 50 is a lateral cross sectional view of FIG. 48 taken along B-B.

FIG. 50 is a lateral cross sectional view of FIG. 48 taken along B-B.

As shown in FIG. 48, FIG. 49 and FIG. 50, the main characteristic is that the lateral positive electric conductive member (109) having the mid portion being formed with an outwardly-protruded structure and the lateral negative electric conductive member (110) having the mid portion being formed with an outwardly-protruded structure at two sides of the electricity storing/discharging device with multiple-layer package structure having electrode plate pair with multiple-sided electric conductive terminals converted into single input/output electric conductive interface pass the openings (1060) of the outer auxiliary insulation package enclosed member (106) at two sides for respectively being served as the input/output electric conductive interface.

FIG. 51 is a schematic structural view showing the lateral positive electric conductive member (109) having the mid portion being formed with an outwardly-protruded structure and the lateral negative electric conductive member (110) having the mid portion being formed with an outwardly-protruded structure at two sides of the electricity storing/discharging device with multiple-layer package structure having electrode plate pair with multiple-sided electric conductive terminals converted into single input/output electric conductive interface shown in FIG. 15 passing openings (1060) of the outer auxiliary insulation package enclosed member (106) at two sides for respectively being served as an input/output electric conductive interface.

FIG. 52 is a lateral cross sectional view of FIG. 51 taken along A-A.

FIG. 53 is a lateral cross sectional view of FIG. 51 taken along B-B.

As shown in FIG. 51, FIG. 52 and FIG. 53, the main characteristic is that the lateral positive electric conductive member (109) having the mid portion being formed with an outwardly-protruded structure and the lateral negative electric conductive member (110) having the mid portion being formed with an outwardly-protruded structure at two sides of the electricity storing/discharging device with multiple-layer package structure having electrode plate pair with multiple-sided electric conductive terminals converted into single input/output electric conductive interface pass the openings (1060) of the outer auxiliary insulation package enclosed member (106) at two sides for respectively being served as the input/output electric conductive interface.

After the plural electricity storing/discharging cells are structured, the electricity storing/discharging cells can be individually operated and combined through electric conductive members, at least one or more of the electricity storing/discharging cells are disposed in the interior of one or more of the housings so as to be collected for forming as a modularized structure which is connected through the electric conductive members or the input/output electric conductive interface of each electricity storing/discharging device for transferring electric energy;

FIG. 54 is a schematic structural view showing the electricity storing/discharging cells being disposed inside the housing (120) for forming as a module according to the present invention.

FIG. 55 is a lateral structural view of FIG. 54.

As shown in FIG. 54 and FIG. 55, at least one or more of the electricity storing/discharging cells are disposed inside the housing (120), wherein:

housing (120): made of a soft flexible material or a rigid material such as stainless steel.

Figure 56:
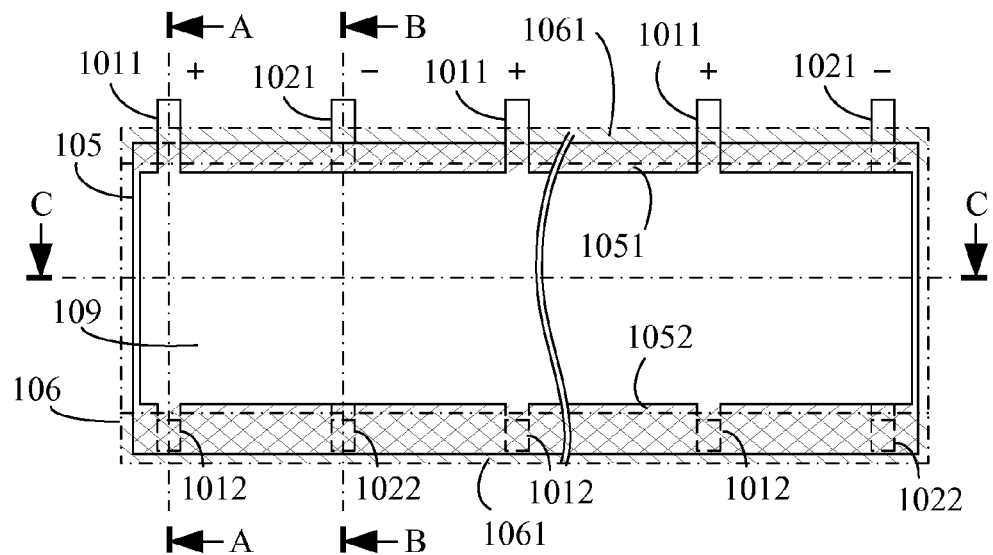
FIG. 56 is a structural develop view showing the single-sided input/output electric conductive terminal and the lateral positive electric conductive member (109) and the lateral negative electric conductive member (110) of the electrode plate pair being sealed as a multi-layer insulation package enclosed member, wherein the input/output electric conductive terminal at one side being served as the single input/output electric conductive interface according to the present invention.

According to the present invention, the electricity storing/discharging device with multiple-layer package structure having electrode plate pair with multiple-sided electric conductive interface can be further formed as a rolling structure, illustrated as followings:

FIG. 56 is a structural develop view showing the single-sided input/output electric conductive terminal and the lateral positive electric conductive member (109) and the lateral negative electric conductive member (110) of the electrode plate pair being sealed as a multi-layer insulation package enclosed member, wherein the input/output electric conductive terminal at one side being served as the single input/output electric conductive interface according to the present invention.

Figures 57, 58:
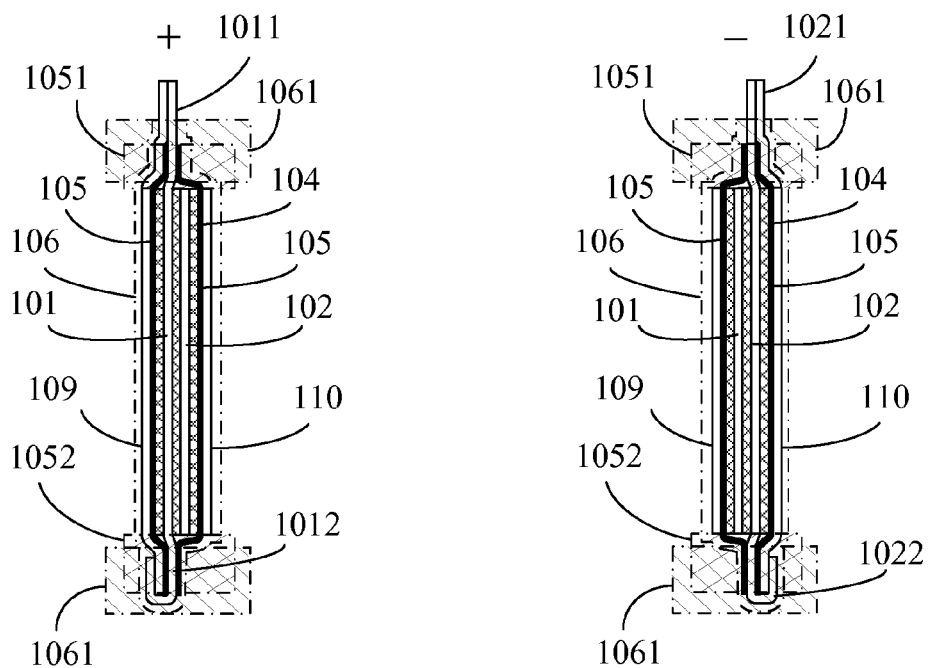
FIG. 57 is a lateral cross sectional view of FIG. 56 taken along A-A.
FIG. 58 is a lateral cross sectional view of FIG. 56 taken along B-B.

FIG. 57 is a lateral cross sectional view of FIG. 56 taken along A-A.

FIG. 58 is a lateral cross sectional view of FIG. 56 taken along B-B.

As shown in FIG. 56, FIG. 57 and FIG. 58, the single-sided input/output electric conductive terminal and the lateral positive electric conductive member (109) and the lateral negative electric conductive member (110) of the electrode plate pair are sealed as a multi-layer insulation package enclosed member for forming as the rolling structure, wherein the input/output electric conductive terminal at one side is served as the single input/output electric conductive interface.

Figure 59:
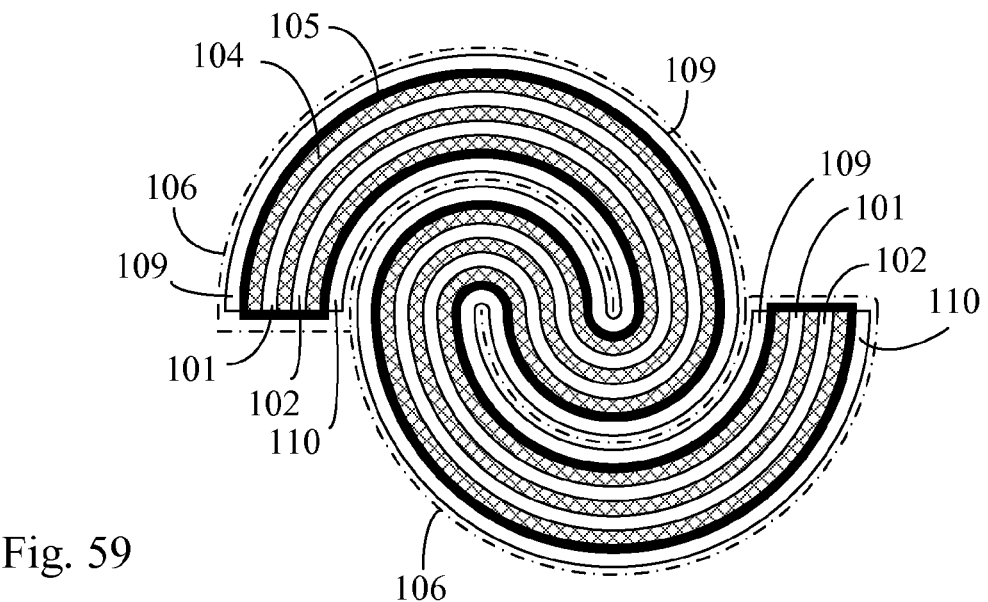
FIG. 59 is the first cross sectional view showing the rolling structure shown in FIG. 56 taken along C-C according to the present invention.

FIG. 59 is the first cross sectional view showing the rolling structure shown in FIG. 56 taken along C-C according to the present invention.

As shown in FIG. 59, for enabling the multi-layer insulation package enclosed member to be used for sealing, one or more of the single-sided individually-arranged positive input/output electric conductive terminals and one or more of the negative input/output electric conductive terminals are individually-arranged for forming as the single input/output electric conductive interface.

Figure 60:
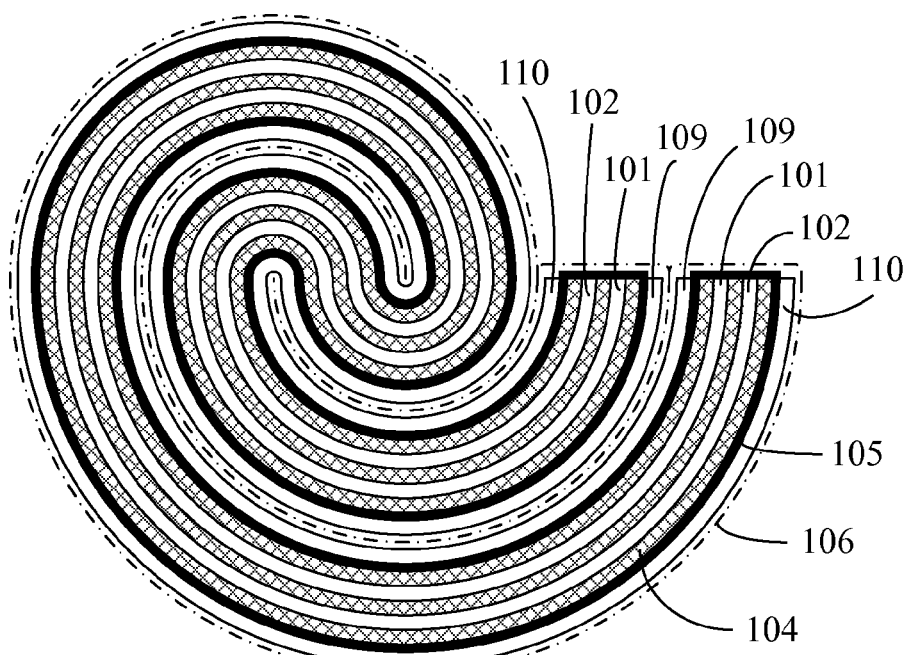
FIG. 60 is the second cross sectional view showing the rolling structure shown in FIG. 56 taken along C-C according to the present invention.

FIG. 60 is the second cross sectional view showing the rolling structure shown in FIG. 56 taken along C-C according to the present invention.

As shown in FIG. 60, for enabling the multi-layer insulation package enclosed member to be used for sealing, one or more of the single-sided adjacently-arranged positive input/output electric conductive terminals and one or more of the negative input/output electric conductive terminals are adjacently-arranged and homo-polarity connected in parallel for forming as the single input/output electric conductive interface.

Figure 61:
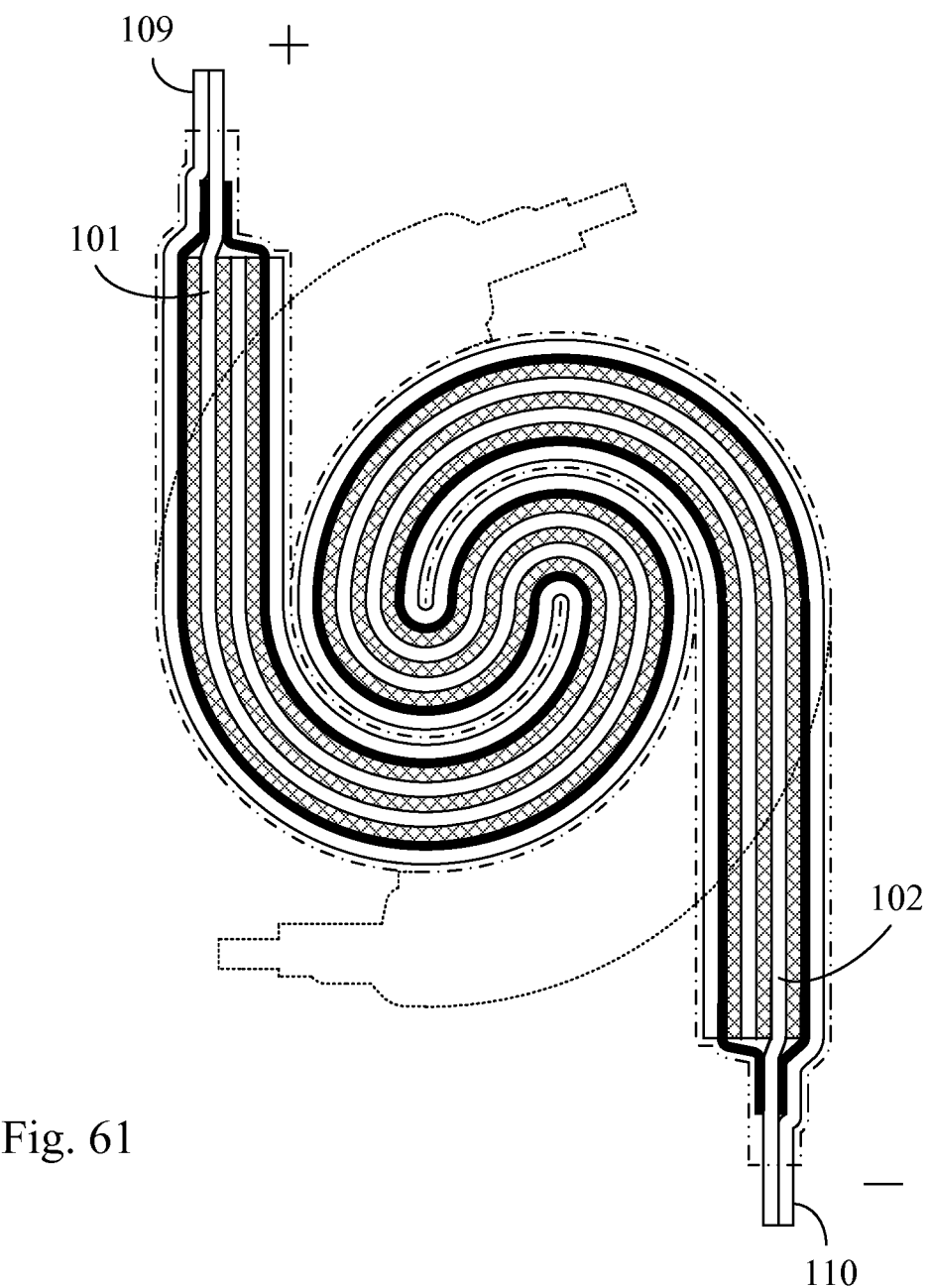
FIG. 61 is the third cross sectional view showing the rolling structure shown in FIG. 56 taken along C-C according to the present invention.

FIG. 61 is the third cross sectional view showing the rolling structure shown in FIG. 56 taken along C-C according to the present invention.

As shown in FIG. 61, for enabling the multi-layer insulation package enclosed member to be used for sealing, only the lateral positive electric conductive member (109) and the lateral negative electric conductive member (110) are served to be structured as the single input/output electric conductive interface.

The applications of the electricity storing/discharging device with multiple-layer package structure having electrode plate pair with multiple-sided electric conductive terminals converted into single input/output electric conductive interface are as followings:
  individually used; or
  homo-polarity connected in parallel; or
  homo-polarity connected in series; or
  reverse-polarity connected in series; or
  homo-polarity connected in parallel, then two ends formed through the parallel connection being connected in series by polarity order for boosting voltage; or
  connected in series by polarity order for boosting voltage, then two ends having the same rated voltage formed through the serial connection being homo-polarity connected in parallel.

According to the electricity storing/discharging device with multiple-layer package structure having electrode plate pair with multiple-sided electric conductive terminals converted into single input/output electric conductive interface, the geometric shape of the electrode plate can be formed in various geometric shapes such as polygonal, circular or elliptical according to actual needs.

According to the electricity storing/discharging device with multiple-layer package structure having electrode plate pair with multiple-sided electric conductive terminals converted into single input/output electric conductive interface, two or more sides of each electrode plate are formed with the input/output electric conductive interface, and the two sides can be opposite sides or adjacent sides or three sides or more sides or the periphery thereof can be formed in the circular or elliptical shape.

According to the electricity storing/discharging device with multiple-layer package structure having electrode plate pair with multiple-sided electric conductive terminals converted into single input/output electric conductive interface, the input/output electric conductive terminal formed on the side of the electrode plate can be one or more than one.

The invention claimed is:

1. An electricity storing/discharging device with a multiple-layer package structure, comprising
   at least one positive electrode plate (101); at least one negative electrode plate (102);
   a separator (104) installed between the at least one positive electrode plate (101) and the at least one negative electrode plate (102);
   at least one first input/output terminal (1011) extending from a first side of the at least one positive electrode plate (101);
   at least one second input/output terminal (1021) extending from a first side of at least one negative electrode plate (102);
   at least one third input/output terminal (1012) extending from a second side opposite the first side of the at least one positive electrode plate (101);
   at least one fourth input/output terminal (1022) extending from a second side opposite the first side of the at least one negative electrode plate (102);
   a sealed packaging member (105) for enclosing the at least one positive electrode plate (101), the at least one negative electrode plate (102), and the separator (104) installed between the electrode plates (101,102) to form an electricity storage/discharge cell, wherein: the sealed packaging member (105) is filled with an electrolyte, the sealed packaging member (105) includes a first sealing zone (1051) for sealing portions of the at least one first and second input/output terminals (1011, 1021) that are adjacent the first side of the at least one positive electrode plate (101) and a second sealing zone (1052) for sealing portions of the at least one third and fourth input/output terminals (1012,1022) that are adjacent the second side of the at least one positive electrode plate (101), and
   the sealed packaging member (105) further includes respective sealed openings through which the at least one first input/output terminal (1011), the at least one second input/output terminal (1021), the at least one third input/output terminal (1012), and the at least one fourth input/output terminal (1022) respective extend to enable input and/or output of electric energy through at least one of the first and third input/output terminals (1011,1012) and at least one of the second and fourth input/output terminals (1021,1022);
   a lateral positive electrically conductive member (109) extending along a first exterior side of the sealed packaging member (105) and electrically connecting the first input/output terminal (1011) to the third input/output terminal (1012);
   a lateral negative electrically conductive member (110) extending along a second exterior side of the sealed packaging member (105) and electrically connecting the second input/output terminal (1021) to the fourth input/output terminal (1022), wherein distal ends of any two of the first input/output terminal (1011), the second input/output terminal (1021), the third input/output terminal (1012) and the fourth input/output terminal (1022) are inwardly bent along an exterior of at least one of the first and second sealing zones (1051,1052) for electrical connection to the respective lateral positive electrically conductive member (109) and lateral negative electrically conductive member (110), and wherein the lateral positive electrically conductive member (109) and lateral negative electrically conductive member (110) form parallel electrical connections between the respective first and third input/output terminals (1011,1012) and second and fourth input/output terminals (1021,1022); and an outer auxiliary insulation package enclosing member (106) for enclosing the electricity storage/discharge cell formed by the sealed packaging member (105), the at least one positive electrode plate (101), the at least one negative electrode plate (102), and the separator (104) installed between the electrode plates (101,102), wherein the outer auxiliary insulation package enclosing member (106) is made of an electrically insulating material and forms a bag-like structure, and wherein the lateral positive electrically conductive member (109) and the lateral negative electrically conductive member (110) are exposed through openings (1060) at two lateral sides of the of the outer auxiliary insulation package enclosing member (106) to form a single input/output electrically conductive interface.

2. An electricity storing/discharging device with a multiple-layer package structure, comprising:

at least one positive electrode plate (101); at least one negative electrode plate (102);

a separator (104) installed between the at least one positive electrode plate (101) and the at least one negative electrode plate (102);

at least one first input/output terminal (1011) extending from a first side of the at least one positive electrode plate (101);

at least one second input/output terminal (1021) extending from a first side of the at least one negative electrode plate (102);

at least one third input/output terminal (1012) extending from a second side opposite the first side of the at least one positive electrode plate (101);

at least one fourth input/output terminal (1022) extending from a second side opposite the first side of the at least one negative electrode plate (102);

a sealed packaging member (105) for enclosing the at least one positive electrode plate (101), the at least one negative electrode plate (102), and the separator (104) installed between the electrode plates (101,102) to form an electricity storage/discharge cell, wherein: the sealed packaging member (105) is filled with an electrolyte, the sealed packaging member (105) includes a first sealing zone (1051) for sealing portions of the at least one first and second input/output terminals (1011, 1021) that are adjacent the first side of the at least one positive electrode plate (101) and a second sealing zone (1052) for sealing portions of the at least one third and fourth input/output terminals (1012,1022) that are adjacent the second side of the at least one positive electrode plate (101), and the sealed packaging member (105) further includes respective sealed openings through which the at least one first input/output terminal (1011), the at least one second input/output terminal (1021), the at least one third input/output terminal (1012), and the at least one fourth input/output terminal (1022) respective extend to enable input and/or output of electric energy through at least one of the first and third input/output terminals (1011,1012) and at least one of the second and fourth input/output terminals (1021,1022);

a lateral positive electrically conductive member (109) extending along a first exterior side of the sealed packaging member (105) and electrically connecting the first input/output terminal (1011) to the third input/output terminal (1012);

a lateral negative electrically conductive member (110) extending along a second exterior side of the sealed packaging member (105) and electrically connecting the second input/output terminal (1021) to the fourth input/output terminal (1022), wherein distal ends of any two of the first input/output terminal (1011), the second input/output terminal (1021), the third input/output terminal (1012) and the fourth input/output terminal (1022) are inwardly bent along an exterior of at least one of the first and second sealing zones (1051,1052) for electrical connection to the respective lateral positive electrically conductive member (109) and lateral negative electrically conductive member (110), and wherein the lateral positive electrically conductive member (109) and lateral negative electrically conductive member (110) form parallel electrical connections between the respective first and third input/output terminals (1011,1012) and second and fourth input/output terminals (1021,1022); and an outer auxiliary insulation package enclosing member (106) for enclosing the electricity storage/discharge cell formed by the sealed packaging member (105), the at least one positive electrode plate (101), the at least one negative electrode plate (102), and the separator (104) installed between the electrode plates (101,102), wherein the outer auxiliary insulation package enclosing member (106) is made of an electrically insulating material and forms a bag-like structure, wherein the lateral positive electrically conductive member (109) and the lateral negative electrically conductive member (110), or the first and second input/output terminals (1011,1021), are exposed through openings in the outer auxiliary insulation package enclosing member (106) to form a single input/output electrically conductive interface.

3. The electricity storing/discharging device with a multiple-layer package structure as claimed in claim 2, wherein the lateral positive electrically conductive member (109) and the lateral negative electrically conductive member (110) each includes a substantially rectangular section.

4. The electricity storing/discharging device with a multiple-layer package structure as claimed in claim 2, wherein the lateral positive electrically conductive member (109) and the lateral negative electrically conductive member (110) are substantially strip-shaped members.

5. The electricity storing/discharging device with a multiple-layer package structure as claimed in claim 2, wherein the lateral positive electrically conductive member (109) and the lateral negative electrically conductive member (110) each includes a substantially circular section.

6. The electricity storing/discharging device with a multiple-layer package structure as claimed in claim 2, wherein the positive electrode plate (101) is extended to form the third input/output terminal (1012) and integrally formed with the lateral positive electrically conductive member (109), the negative electrode plate (102) is extended to form the fourth input/output terminal (1022) and integrally formed with the lateral negative electrically conductive member (110), and the third input/output terminal (1012) and the fourth input/output terminal (1022) are respectively combined with the first input/output terminal (1011) and the second input/output terminal (1021).

7. The electricity storing/discharging device with a multiple-layer package structure as claimed in claim 6, wherein:
the outer auxiliary insulation package enclosing member (106) includes an outer sealing zone (1061) for forming, together with the first sealing zone (1051), a seal around mid-portions of the first and second input/output terminals (1011,1021), and
distal portions of the first and second input/output terminals (1011,1021) are exposed through openings in a same side of the outer auxiliary insulation package enclosing member (106) to form the single input/output electrically conductive interface.

8. The electricity storing/discharging device with a multiple-layer package structure as claimed in claim 6, wherein the lateral positive electrically conductive member (109) and the lateral negative electrically conductive member (110) are exposed through openings (1060) at two lateral sides of the of the outer auxiliary insulation package enclosing member (106) to form the single input/output electrically conductive interface.

9. The electricity storing/discharging device with a multiple-layer package structure as claimed in claim 6, wherein the lateral positive electrically conductive member (109) and the lateral negative electrically conductive member (110) are laterally extended to form a respective lateral positive auxiliary electrically conductive member (1091) and a lateral negative auxiliary electrically conductive member (1101), and the lateral positive electrically conductive member (109) and the lateral negative electrically conductive member (110) are exposed through openings (1060) at two lateral sides of the of the outer auxiliary insulation package enclosing member (106) to form the single input/output electrically conductive interface.

10. The electricity storing/discharging device with a multiple-layer package structure as claimed in claim 6, wherein a mid-portion of the lateral positive electrically conductive member (109) and a mid-portion of the lateral negative electrically conductive member (110) each includes an outwardly protruding structure exposed through a respective opening (1060) in lateral sides of the outer auxiliary insulation package enclosing member (106) to form the single input/output electrically conductive interface.

11. The electricity storing/discharging device with a multiple-layer package structure as claimed in claim 2, wherein:
the outer auxiliary insulation package enclosing member (106) includes an outer sealing zone (1061) for forming, together with the first sealing zone (1051), a seal around mid-portions of the first and second input/output terminals (1011,1021), and
distal portions of the first and second input/output terminals (1011,1021) are exposed through openings in a same side of the outer auxiliary insulation package enclosing member (106) to form the single input/output electrically conductive interface.

12. The electricity storing/discharging device with a multiple-layer package structure as claimed in claim 2, wherein the lateral positive electrically conductive member (109) and the lateral negative electrically conductive member (110) are exposed through openings (1060) at two lateral sides of the of the outer auxiliary insulation package enclosing member (106) to form the single input/output electrically conductive interface.

13. The electricity storing/discharging device with a multiple-layer package structure as claimed in claim 2, wherein the lateral positive electrically conductive member (109) and the lateral negative electrically conductive member (110) are laterally extended to form a respective lateral positive auxiliary electrically conductive member (1091) and a lateral negative auxiliary electrically conductive member (1101), and the lateral positive electrically conductive member (109) and the lateral negative electrically conductive member (110) are exposed through openings (1060) at two lateral sides of the of the outer auxiliary insulation package enclosing member (106) to form the single input/output electrically conductive interface.

14. The electricity storing/discharging device with a multiple-layer package structure as claimed in claim 2, wherein a mid-portion of the lateral positive electrically conductive member (109) and a mid-portion of the lateral negative electrically conductive member (110) each includes an outwardly protruding structure exposed through a respective opening (1060) in lateral sides of the outer auxiliary insulation package enclosing member (106) to form the single input/output electrically conductive interface.

15. The electricity storing/discharging device with a multiple-layer package structure as claimed in claim 2, wherein the electricity storage/discharge cell and the outer auxiliary insulation package enclosing member (106) are formed into a rolled structure.

16. The electricity storing/discharging device as claimed in claim 2, further comprising at least one additional said first input/output terminal (1011), at least one additional said second input/output terminal (1021), the multiple first and second input/output terminals (1011,1021) being exposed through the openings in the outer auxiliary insulation package enclosing member (106) to form the single input/output electrically conductive interface.

17. The electricity storing/discharging device as claimed in claim 2, wherein multiple said first input/output terminals (1011) and multiple said second input/output terminal (1021) and adjacently-arranged like-polarity terminals are connected in parallel to form the single input/output electrically conductive interface.

18. The electricity storing/discharging device as claimed in claim 2, wherein the electricity storing/discharging device is applied in at least one of the following configurations:
as a stand-alone electricity storing/discharging device;
as same-polarity electricity storing/discharging devices connected in parallel;
as same-polarity electricity storing/discharging devices connected in series;
as reverse-polarity electricity storing/discharging devices connected in series;
as a pair of same-polarity electricity storing/discharging devices connected in parallel to each other and series-connected with another pair of same-polarity electricity storing/discharging devices connected in parallel; and
as series connected electricity storing/discharging devices connected in parallel with another electricity storing/discharging device or series of electricity storing/discharging devices having a same polarity.

19. The electricity storing/discharging device as claimed in claim 2, wherein a plurality of the electricity storing/discharging devices are provided in a housing (120).

20. The electricity storing/discharging device with a multiple-layer package structure as claimed in claim 2, wherein the outer auxiliary insulation package enclosing member (106) is made of an aluminum laminated film.

* * * * *